(12) United States Patent
Byun et al.

(10) Patent No.: US 12,462,774 B2
(45) Date of Patent: Nov. 4, 2025

(54) DISPLAY DEVICE AND OPERATING METHOD THEREOF

(71) Applicant: Samsung Electronics Co., Ltd., Suwon-si (KR)

(72) Inventors: Jeongmoon Byun, Suwon-si (KR); Hansoo Seong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/431,391

(22) Filed: Feb. 2, 2024

(65) Prior Publication Data
US 2024/0265890 A1      Aug. 8, 2024

(30) Foreign Application Priority Data
Feb. 6, 2023   (KR) .................. 10-2023-0015725

(51) Int. Cl.
G09G 5/00       (2006.01)
G02B 27/01      (2006.01)
G09G 5/12       (2006.01)

(52) U.S. Cl.
CPC ............. *G09G 5/12* (2013.01); *G02B 27/017* (2013.01); *G09G 5/001* (2013.01); *G02B 2027/0178* (2013.01); *G09G 2310/08* (2013.01); *G09G 2340/10* (2013.01); *G09G 2360/04* (2013.01); *G09G 2360/128* (2013.01)

(58) Field of Classification Search
None
See application file for complete search history.

(56) References Cited

U.S. PATENT DOCUMENTS

| | | |
|---|---|---|
| 10,504,442 B2 | 12/2019 | Yoo |
| 10,546,364 B2 | 1/2020 | Bastani et al. |
| 10,650,791 B2 | 5/2020 | Kempf et al. |
| 10,949,947 B2 | 3/2021 | Steyskal et al. |
| 11,106,039 B2 | 8/2021 | Riguer et al. |
| 11,307,655 B2 | 4/2022 | Riguer et al. |
| 2018/0033405 A1* | 2/2018 | Tall .................... G06T 9/00 |
| 2021/0099693 A1 | 4/2021 | Ninan |
| 2022/0036853 A1* | 2/2022 | Bae .................... G09G 5/12 |
| 2022/0270539 A1 | 8/2022 | Lu et al. |

* cited by examiner

*Primary Examiner* — Joseph R Haley
(74) *Attorney, Agent, or Firm* — Wolf, Greenfield & Sacks, P.C.

(57) ABSTRACT

A display device includes a memory, a timing controller including a scaler, and a processor, wherein the processor is configured to generate, via the scaler, a first sync signal based on an input timing of at least one piece of background image data, generate, via the scaler, a second sync signal based on an input timing of at least one piece of region of interest (ROI) image data, transmit, to the scaler, the at least one piece of background image data output from the memory during a first period according to the first sync signal, and transmit, to the scaler, the at least one piece of ROI image data output from the memory during a second period according to the second sync signal.

20 Claims, 11 Drawing Sheets

DISPLAY DEVICE AND OPERATING METHOD THEREOF

CROSS-REFERENCE TO RELATED APPLICATION

This application is based on and claims priority under 35 U.S.C. § 119 to Korean Patent Application No. 10-2023-0015725, filed on Feb. 6, 2023, in the Korean Intellectual Property Office, the disclosure of which is incorporated by reference herein in its entirety.

BACKGROUND

The inventive concepts relate to display devices, and more particularly, to display devices including a processor and a timing controller, which are used to generate a foveated image.

With the recent technological developments, various types of wearable display devices which may be worn on the body have been developed. Among them, extended reality (XR) glasses, such as head-mounted display (HMD) wearable devices that are worn on the head of a user, provide visual information through a display to provide an XR service to the user.

Previous XR glasses may display a foveated image focused on a region of interest (ROI) of a user in an image that is displayed to provide a real XR service to the user. The foveated image may be generated by tracking a gaze of a user receiving an XR service and mixing an image of a gaze area of the user generated as a high resolution image and an image of a background area other than the gaze area, generated as a low resolution image. However, when the foveated image is generated, power may be excessively consumed and a graphics data throughput greater than or equal to a reference value may be generated by a graphics processing unit (GPU) in the process of mixing the image of the gaze area of the user and the image of the background area, which have different resolutions from each other, and thus, the performance of a display device may be degraded.

SUMMARY

Some example embodiments of the inventive concepts provide a display device capable of controlling a transmission timing of an image of a region of interest (ROI) of a user (hereinafter, referred to as an ROI image) and a background image, based on a timing of mixing the ROI image and the background image.

Technical objectives of the inventive concepts are not limited to those mentioned above, and other unmentioned technical objectives will be clearly understood by one of ordinary skill in the art from the descriptions below.

According to some example embodiments of the inventive concepts, a display device may include a memory, a timing controller including a scaler, and a processor, wherein the processor is configured to generate, via the scaler, a first sync signal based on an input timing of at least one piece of background image data, generate, via the scaler, a second sync signal based on an input timing of at least one piece of region of interest (ROI) image data, transmit, to the scaler, the at least one piece of background image data output from the memory during a first period according to the first sync signal, and transmit, to the scaler, the at least one piece of ROI image data output from the memory during a second period according to the second sync signal.

According to some example embodiments of the inventive concepts, an operating method of a display device, where the display device includes a processor, a timing controller, and a memory, may be an operating method that includes generating, via the processor, a first sync signal and a second sync signal based on a mixing timing of at least one piece of background image data and at least one piece of region of interest (ROI) image data, transmitting, via the processor, the at least one piece of background image data to the timing controller during a first period, according to the first sync signal, and transmitting, via the processor, the at least one piece of ROI image data to the timing controller during a second period, according to the second sync signal.

According to some example embodiments of the inventive concepts, a wearable electronic device may include at least one sensor, a timing controller, and a processor, wherein the processor is configured to generate a region of interest (ROI) image based on a gaze of a user tracked based on using the at least one sensor, generate, via the timing controller, a first sync signal and a second sync signal based on a mixing timing of at least one piece of background image data and at least one piece of ROI image data, transmit the at least one piece of background image data to the timing controller during a first period according to the first sync signal, and transmit the at least one piece of ROI image data to the timing controller during a second period according to the second sync signal.

BRIEF DESCRIPTION OF THE DRAWINGS

Example embodiments will be more clearly understood from the following detailed description taken in conjunction with the accompanying drawings in which.

DETAILED DESCRIPTION

As described below, some example embodiments are described with reference to the accompanying drawings. However, it will be understood by one of ordinary skill in the art that the inventive concepts may be implemented as other detailed forms without the technical concept or essential features thereof being changed. Therefore, the example embodiments described below shall be understood as examples rather than definitions, in all aspects.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Hereinafter, some example embodiments of the inventive concepts will be described in detail with reference to the accompanying drawings.

Figure 1:
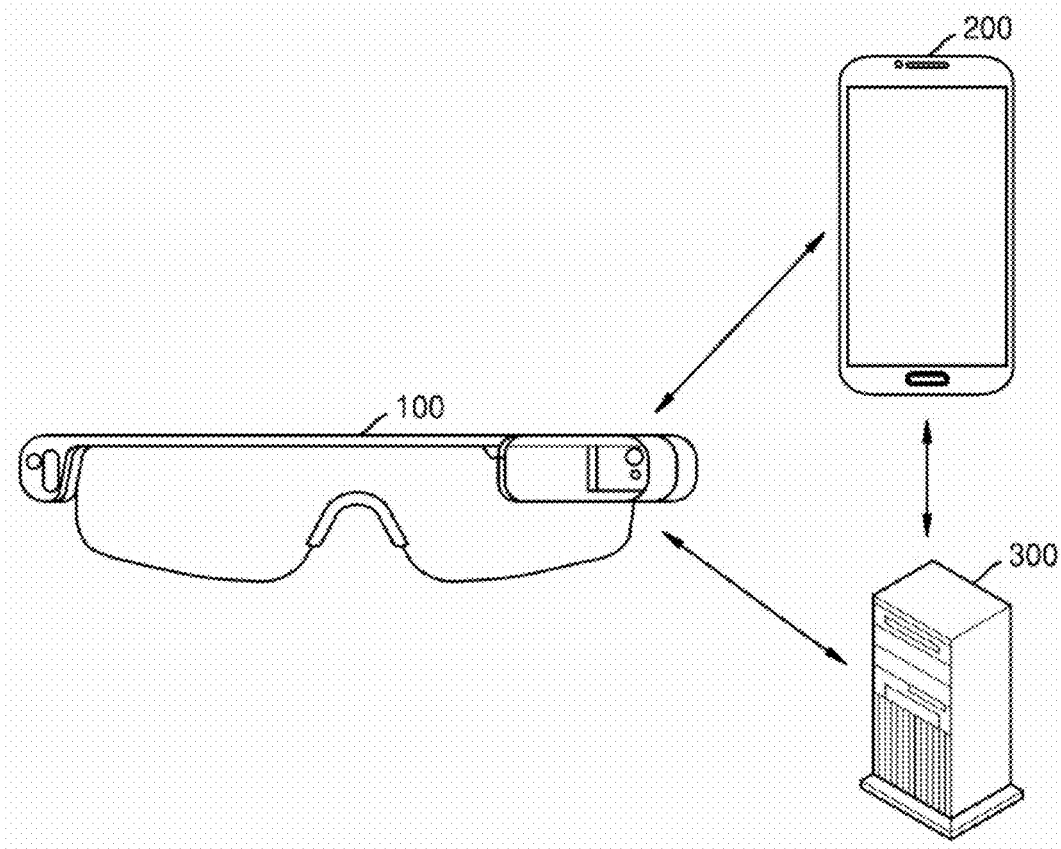
FIG. 1 is a view for describing a display system according to some example embodiments.

FIG. 1 is a view for describing a display system according to some example embodiments.

Referring to FIG. 1, the display system according to some example embodiments may include a display device 100 (e.g., wearable glasses), a mobile terminal 200, and a server 300. The display device 100 in the present specification may include a wearable display device. However, the display system may be realized (e.g., implemented) by including more or less elements than the elements illustrated in FIG. 1. For example, the display system may be realized by including the display device 100 and the mobile terminal 200 (e.g., omitting the server) or by including the display device 100 and the server 300 (e.g., omitting the mobile terminal 200).

The display device 100 may be communication-connected (e.g., communicatively coupled) to at least one of the mobile terminal 200 or the server 300. For example, the display device 100 may perform short-range wireless communication with the mobile terminal 200. Examples of the short-range wireless communication may include, but are not limited to, a wireless local area network (WiFi), near-field communication (NFC), Bluetooth, Bluetooth low energy (BLE), Zigbee, WiFi direct (WFD), ultra-wideband (UWB), etc. The display device 100 may be connected to the server 300 through wireless communication or mobile communication.

The mobile terminal 200 may transmit certain data to the display device 100 or receive certain data from the display device 100. For example, the mobile terminal 200 may transmit, to the display device 100, a message instructing the display device 100 to control a transmission time point of a background image and a transmission timing of an image of a region of interest (ROI) of a user (hereinafter, referred to as an ROI image) by considering a timing of mixing the ROI image and the background image, or a control command with respect to generation of a foveated image.

The mobile terminal 200 may be implemented as various forms. For example, the mobile terminal 200 described in this specification may include a cellular phone, a smartphone, a laptop computer, a tablet personal computer (PC), an electronic-book reader, a digital-broadcasting terminal, a personal digital assistant (PDA), a portable multimedia player (PMP), a navigation device, an MP3 player, a digital camera, etc., but is not limited thereto.

The server 300 may be a cloud server managing the display device 100. Also, the server 300 may be a content provider providing an instruction message for controlling a transmission time point of a background image and a transmission timing of an ROI image by considering a mixing timing of the ROI image and the background image or providing a message with respect to generation of a foveated image.

According to some example embodiments, the server 300 may include an intelligence engine, and the server 300 may extract an ROI of a user (e.g., a gaze area of the user) by analyzing a gaze pattern (state) of the user or a motion pattern (state) of the user through the intelligence engine. In addition to the server 300, the ROI (e.g., the gaze area of the user) may also be analyzed directly by at least one of the display device 100 or the mobile terminal 200 connected to the display device 100 to be capable of performing communication or short-range wireless communication with the display device 100.

Also, the ROI (or the gaze area of the user) extracted based on the gaze pattern (state) analyzed by the server 300 may be directly transmitted to the display device 100 or may be transmitted to the display device 100 through the mobile terminal 200 connected to the display device 100 based on performing communication or short-range wireless communication with the display device 100.

Hereinafter, a method, performed by the display device 100, of generating a foveated image by controlling a transmission time point of a background image and a transmission timing of an ROI image based on a mixing timing of the ROI image and the background image is described in detail with reference to FIGS. 2 to 7.

Figure 2:
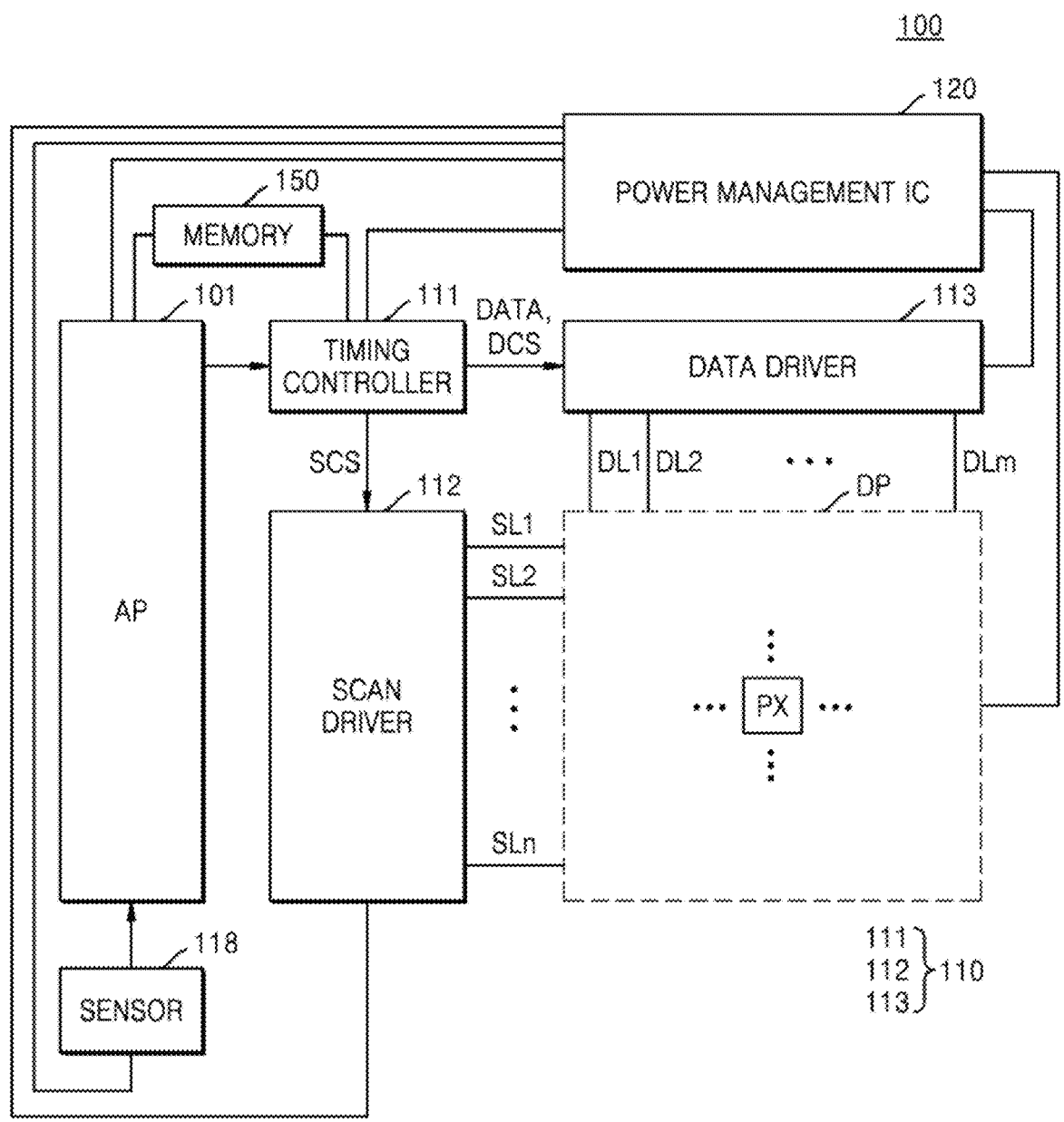
FIG. 2 is a block diagram of a display device according to some example embodiments.

FIG. 2 is a block diagram of a display device according to some example embodiments.

Referring to FIG. 2, the display device 100 according to the inventive concepts may include an application processor (AP) (hereinafter, referred to as a processor) 101, a display panel DP including a plurality of pixels PX, a timing controller 111, a scan driver 112, a data driver 113, and a power management integrated circuit (PMIC) 120. The display device 100 may include a memory 150. The display device 100 may include at least one sensor 118 In this specification, the display device 100 may include a wearable display device (e.g., wearable glasses).

According to some example embodiments, the processor 101 may track a gaze of a user and identify a gaze area of the user. The gaze area of the user is an area at which the gaze of the user stays from among a plurality of areas included on a display panel and may denote an ROI of the user. The processor 101 may track the gaze area of the user (or the ROI of the user) by using at least one sensor 118 (e.g., an image sensor such as a camera, which may be configured to generate images of at least a portion of the user, for example images of one or more eyes of the user) where the processor 101 may track the gaze area of the user based on processing one or more images generated by the at least one sensor 118 and may generate and process an image (e.g., an image generated by the at least one sensor 118) based on the tracked gaze area of the user.

According to some example embodiments, the processor 101 may, by using a first sync generator, generate a first sync signal for transmitting background image data and a second sync signal for transmitting ROI image data, based on a timing of mixing an ROI image and a background image.

According to some example embodiments, the processor 101 may transmit, according to the first sync signal, at least one piece of background image data output from a memory 150, to the timing controller 111, during a first period, and may transmit, according to the second sync signal, at least one piece of ROI image data output from the memory 150, to the timing controller 111, during a second period. The first period may denote a period for transmitting the entirety of an output image forming one frame (e.g., an entirety of a period in which an entirety of the output image is generated), and the second period may denote a period for mixing the at least one piece of background image data and the at least one piece of ROI image data, the second period being included in the first period. The second period may be referred to as a mixing period of the at least one piece of background image data and the at least one piece of ROI image data. In some example embodiments, the processor 101 may control a transmission timing of at least one piece of ROI image data based on a starting time point of the second period. A starting time point (also referred to herein interchangeably as a start time point) of the second period may be determined based on a position of an ROI of a user in the output image.

According to some example embodiments, the processor 101 may control a transmission timing of the at least one piece of background image data by adjusting any one of a cycle of the first sync signal or the number of pixel lines transmitted during one cycle of the first sync signal.

According to some example embodiments, the processor 101 may control a transmission timing of the at least one piece of ROI image data by adjusting any one of a cycle of the second sync signal or the number of pixel lines transmitted during one cycle of the second sync signal.

According to some example embodiments, the timing controller 111 may provide a data value DATA, a data control signal DCS, etc. with respect to each frame to the data driver 113.

According to some example embodiments, the timing controller 111 may provide (e.g., transmit) a clock signal, a scan control signal SCS, etc. to the scan driver 112. The timing controller 111 may receive the at least one piece of background image data and the at least one piece of ROI image data from the processor 101.

Here, a line buffer may denote a buffer having a much smaller capacity or size than a normal intermediate buffer (that is, a frame buffer). For example, the line buffer may be formed as a size (e.g., a buffer having a memory capacity of data that may be stored in the buffer) corresponding to the amount of image data transmitted during one sync signal cycle (e.g., pixel value data of one pixel line). The timing controller 111 may generate an output image, which is a foveated image, by scaling up and mixing the at least one piece of background image data and the at least one piece of ROI image data received from the processor 101.

According to some example embodiments, the data driver 113 may generate data voltages to be provided to data lines DL1 to DLm by using the data value DATA and the data control signal DCS received from the timing controller 111. Here, m is a natural number (e.g., any natural number).

According to some example embodiments, the scan driver 112 may generate scan signals to be provided to scan lines SL1 to SLn, by receiving the scan control signal SCS (including a clock signal, a scan start signal, etc.) from the timing controller 111 (e.g., based on using the scan control signal SCS received from the timing controller 111). Here, n is a natural number (e.g., any natural number).

According to some example embodiments, the display panel DP may include a light-receiving layer, a light-emitting layer, and a transparent layer which are vertically stacked. Here, the light-receiving layer may include at least one light detector configured to measure a reflection pattern, and the light-emitting layer may be arranged above the light-receiving layer and may include the plurality of pixels PX. The transparent layer may be arranged above the light-emitting layer in the display panel DP and may include a flexible material.

According to some example embodiments, the display panel DP may include the plurality of pixels PX (e.g., a plurality of light-emitting diodes). Each of the plurality of pixels PX may be connected to a data line and a scan line corresponding thereto.

According to some example embodiments, each of the plurality of pixels PX may be a red pixel emitting (e.g., configured to emit) red light, a blue pixel emitting blue light, or a green pixel emitting green light. As another example, the plurality of pixels PX may include white, cyan, magenta, and yellow pixels, rather than red, green, and blue pixels.

In this specification, a circuit including at least one of the timing controller 111, the scan driver 112, and the data driver 113 may be referred to as a display driver integrated (DDI) circuit 110.

According to some example embodiments, the DDI circuit 110 may be provided in the form of an integrated circuit.

According to some example embodiments, the PMIC 120 may receive an external power supply (e.g., a battery voltage). For example, the PMIC 120 may generate a voltage to be supplied to the DDI circuit 110, based on the external input voltage. As shown, the PMIC 120 may be communicatively coupled (e.g., electrically coupled) to any portion of the DDI circuit 110, including the timing controller 111, the scan driver 112, and/or the data driver 113. As further shown, in some example embodiments, the PMIC 120 may be communicatively coupled to the processor 101, the at least one sensor 118, and/or the display panel DP.

According to some example embodiments, the PMIC 120 may generate a voltage to be provided (e.g., transmitted) to the timing controller 111 of the DDI circuit 110 or the processor 101. The PMIC 120 may generate a voltage for controlling (e.g., to control) a transmission timing of a background image or an ROI image or a voltage for generating a foveated image and may provide (e.g., transmit) the generated voltage to the timing controller 111 or the processor 101.

According to some example embodiments, the PMIC 120 may include at least one regulator. For example, the at least one regulator may generate an output voltage having various voltage levels (e.g., voltage magnitudes), from a voltage supplied from an external power supply. For example, the at least one regulator may be formed (e.g., implemented) as a controller or may be arranged in the controller. For example, the at least one regulator may include a buck-converter, but is not limited thereto. For example, the at least one regulator may include at least one of a buck-boost converter, a boost converter, or a Ćuk converter.

Figure 3:
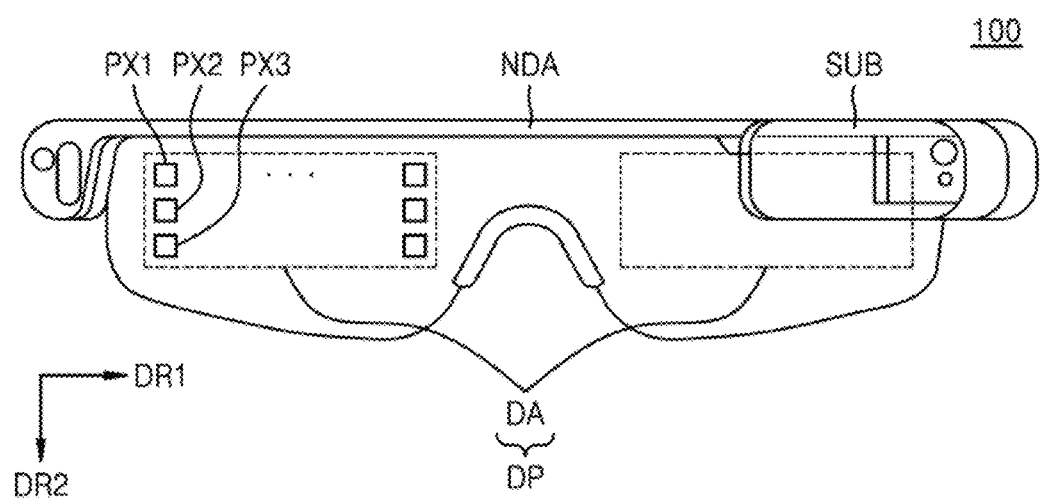
FIG. 3 is a plan view of a display device according to some example embodiments.

FIG. 3 is a plan view of the display device 100 according to some example embodiments.

Referring to FIGS. 2 and 3, the display device 100 may include a driving portion provided on a substrate SUB and configured to drive pixels PX1, PX2, and PX3 each including at least one light-emitting diode LD, and a line portion configured to connect the pixels PX1, PX2, and PX3 to the driving portion.

As described above, the inventive concepts are described according to some example embodiments. However, one of ordinary skill in the art shall understand that the inventive concepts may be variously modified and changed within a range not deviating from the concept and the range of the inventive concepts described in the claims.

According to some example embodiments, the substrate SUB may include a display area DA and a non-display area NDA.

According to some example embodiments, the display area DA may be an area in which the pixels PX1, PX2, and PX3 displaying an image are provided. As shown in FIG. 3, the display area DA may include certain right/left glass portions of the wearable glasses of the display device 100, but example embodiments are not limited thereto. The non-display area NDA may be an area in which the driving portion configured to drive the pixels PX1, PX2, and PX3 and a portion of the line portion configured to connect the pixels PX1, PX2, and PX3 with the driving portion are provided. For example, the display device 100 may realize an ROI image corresponding to a gaze area of a user as a high resolution and may realize a background image corresponding to a background area as a low resolution, by using the pixels PX1, PX2, and PX3 of the display area DA. For example, the at least one piece of background image data may be formed as pixel value data corresponding to a low-resolution image, and the at least one piece of ROI image data may be formed as pixel value data corresponding to a high-resolution image.

According to some example embodiments, the non-display area NDA may be arranged to be adjacent to the display area DA. The non-display area NDA may be provided on at least one side of the display area DA. For example, the non-display area NDA may surround a circumference (or an edge) of the display area DA of a wearable electronic device (e.g., wearable glasses).

According to some example embodiments, the line portion may be configured to electrically connect the driving portion with the pixels PX1, PX2, and PX3 of the display area DA of the wearable electronic device (e.g., the wearable glasses). The line portion may include a fan-out line connected to signal lines configured to provide signals to the pixels PX1, PX2, and PX3 and respectively connected to the pixels PX1, PX2, and PX3, for example, a scan line, a data line, and an emission control line.

According to some example embodiments, the substrate SUB may include a transparent insulating material that is configured to transmit light. The substrate SUB may include a rigid substrate or a flexible substrate.

According to some example embodiments, the pixels PX1, PX2, and PX3 of the display area DA (e.g., right/left glass portions of the wearable glasses) of the wearable electronic device (e.g., the wearable glasses) may include a first pixel PX1, a second pixel PX2, and a third pixel PX3. For example, the first pixel PX1 may be a red pixel, the second pixel PX2 may be a green pixel, and the third pixel PX3 may be a blue pixel. However, the first to third pixels PX1 to PX3 are not limited thereto, and the first to third pixels PX1 to PX3 may respectively emit light of different colors from red, green, and blue.

According to some example embodiments, the first to third pixels PX1 to PX3 may be sequentially arranged in a second direction DR2.

According to some example embodiments, each of the first to third pixels PX1 to PX3 may include at least one light-emitting diode LD driven by a scan signal and a data signal corresponding thereto. The light-emitting diode LD may have a small size of a nanoscale (or a nanometer) or a microscale (or a micrometer), and adjacent light-emitting diodes LD may be connected to each other in parallel. However, the light-emitting diode LD is not limited thereto. The light-emitting diode may form a light source of each of the first to third pixels PX1 to PX3.

An operation, performed by the display device 100, of controlling a transmission timing of background image data and ROI image data, according to some example embodiments is described below with reference to FIGS. 4A and 4B.

Figure 4A:
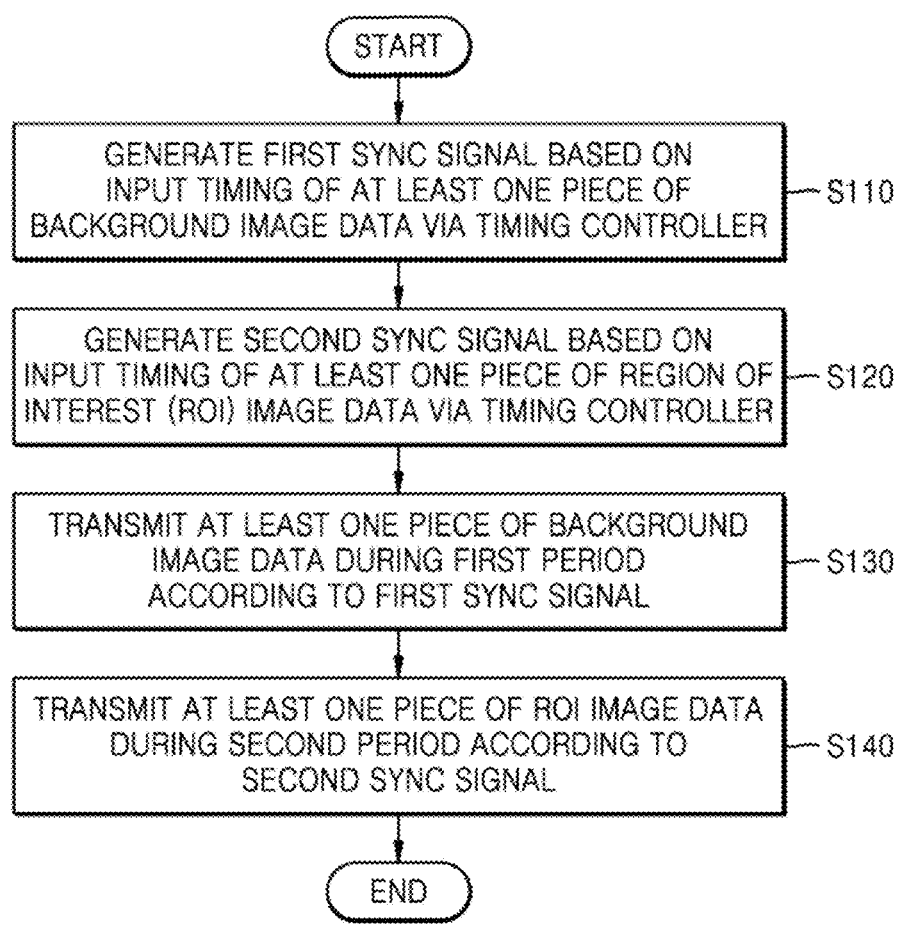
FIG. 4A is a flowchart of an operating method of a display device, according to some example embodiments.

FIG. 4A is a flowchart of an operating method of a display device, according to some example embodiments.

In detail, FIG. 4A is a view for describing a method, performed by the processor 101 of the display device 100 of FIG. 2, of transmitting background image data and ROI image data by adjusting a transmission timing of the background image data and the ROI image data based on an input timing of the background image data and the ROI image data of the timing controller 111 (e.g., a scaler). In this specification, the display device 100 may include a wearable display device (e.g., wearable glasses).

Referring to FIG. 4A, the operation, performed by the processor 101 of the display device 100 of FIG. 2, of transmitting the background image data and the ROI image data to the timing controller 111 by controlling the transmission timing of the background image data and the ROI image data may include operations S110, S120, S130, and S140.

In operation S110, the processor 101 of the display device 100 may generate a first sync signal based on an input timing of at least one piece of background image data of the timing controller 111. In operation S120, the processor 101 may generate a second sync signal based on an input timing of at least one piece of ROI image data of the timing controller 111. Here, the at least one piece of background image data may denote pixel value data of a background image included in at least one pixel line of background image data, and the at least one piece of ROI image data may denote pixel value data of an ROI image included in at least one row line, of the ROI image data.

According to some example embodiments, the processor 101 may control a transmission timing of the at least one piece of background image data by adjusting a cycle of the first sync signal and may control a transmission timing of the at least one piece of ROI image data by adjusting a cycle of the second sync signal.

Here, the cycle of the first sync signal may denote a time period from a transmission starting time point of a previous pixel line of the background image data to a transmission starting time point of a next pixel line. That is, the cycle of the first sync signal may denote a transmission time period of one pixel line in the background image data. The cycle of the second sync signal may denote a time period from a transmission starting time point of a previous pixel line of the ROI image data to a transmission starting time point of a next pixel line. That is, the cycle of the second sync signal may denote a transmission time period of one pixel line in the ROI image data.

According to some example embodiments, the processor 101 may control the transmission timing of the at least one piece of background image data by adjusting the number of pixel lines transmitted during one cycle of the first sync signal and may control the transmission timing of the at least one piece of ROI image data by adjusting the number of pixel lines transmitted during one cycle of the second sync signal. Here, the number of pixel lines transmitted during the one cycle of the first sync signal and the one cycle of the second sync signal may denote the number of row lines of a plurality of pixel lines included in the background image and the ROI image.

The operation of controlling the transmission timing of the at least one piece of background image data and the transmission timing of the at least one piece of ROI image data by adjusting the cycle of the first sync signal and the cycle of the second sync signal, respectively, or the number of pixel lines transmitted during one cycle of the first sync signal and the number of pixel lines transmitted during one cycle of the second sync signal, respectively, will be described in detail below with reference to FIGS. 5A and 5B.

In operation S130, the processor 101 may transmit the at least one piece of background image data during a first period according to the first sync signal, and in operation S140, the processor 101 may transmit the at least one piece of ROI image data during a second period according to the second sync signal.

Here, the first period may denote an entire time period for generating an output image (e.g., the time period that elapses from a start of generating the output image to a completion of generating the output image). The second period may denote a time period during which the at least one piece of background image data and the at least one piece of ROI image data are mixed, the second period being included in the first period. For example, a starting time point of the second period may indicate a mixing start time point of the at least one piece of background image data and the at least one piece of ROI image data. As a result, the second period may be referred to as a mixing period of the at least one piece of background image data and the at least one piece of ROI image data.

According to some example embodiments, the processor 101 may transmit a first data control signal indicating a first valid transmission period to a memory (e.g., memory 150), and the processor 101 may transmit, according to the first sync signal, the at least one piece of background image data output from the memory (e.g., memory 150), to the timing controller 111 (e.g., the scaler of the timing controller 111), during the first valid transmission period included in the first period, and may stand by during a remaining period of the first period. For example, the first valid transmission period may be determined based on any one of the cycle of the first sync signal or the number of pixel lines transmitted during one cycle of the first sync signal.

According to some example embodiments, the processor 101 may transmit a second data control signal indicating a second valid transmission period to the memory (e.g., memory 150), and the processor 101 may transmit, according to the second sync signal, the at least one piece of ROI image data output from the memory (e.g., memory 150), to the timing controller 111 (e.g., the scaler of the timing controller 111), during the second valid transmission period included in the second period, and may stand by during a remaining period of the second period. For example, the second valid transmission period may be determined based on any one of the cycle of the second sync signal or the number of pixel lines transmitted during one cycle of the second sync signal.

Figure 4B:
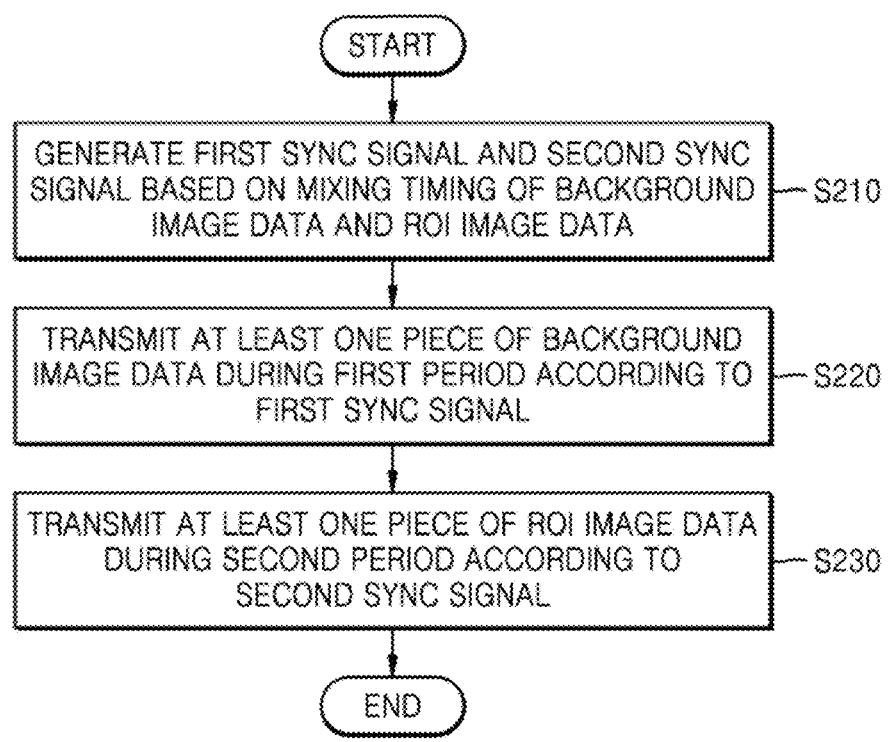
FIG. 4B is a flowchart of an operating method of a display device, according to some example embodiments.

FIG. 4B is a flowchart of an operating method of a display device according to some example embodiments.

In detail, FIG. 4B is a view for describing a method, performed by the processor 101 of the display device 100 of FIG. 2, of transmitting background image data and ROI image data by adjusting a transmission timing of the background image data and the ROI image data based on a mixing timing of the background image data and the ROI image data of the timing controller 111 (e.g., a scaler). In this specification, the display device 100 may include a wearable display device (e.g., wearable glasses).

Referring to FIG. 4B, the operation, performed by processor 101 of the display device 100 of FIG. 2, of transmitting the background image data and the ROI image data to the timing controller 111 by controlling the transmission timing of the background image data and the ROI image data may include operations S210, S220, S230.

In operation S210, the processor 101 of the display device 100 may generate a first sync signal and a second sync signal based on a mixing timing of the background image data and the ROI image data. For example, the mixing timing of the background image data and the ROI image data may be determined based on a position of a gaze area of a user (e.g., an ROI of the user) from among a plurality of areas included in an entire displayed image (e.g., a background image), that is, a position of an ROI image in the background image. For example a start time point of a second period as described herein may be determined based on a position of an ROI of a user in the output image and a length of the second period may be determined based on a number of pixel lines included in the ROI of the user.

According to some example embodiments, the processor 101 may generate the first sync signal and the second sync signal to be synchronized to the mixing timing of the background image data and the ROI image data. The operation, performed by the processor 101, of controlling transmission timings of at least one piece of background image data and at least one piece of ROI image data based on the first and second sync signals synchronized to the mixing timing of the background image data and the ROI image data will be described in detail below with reference to FIGS. 5A to 6. Here, the at least one piece of background image data may denote pixel value data of a background image included in at least one pixel line, of background image data, and the at least one piece of ROI image data may denote pixel value data of an ROI image included in at least one row line, of the ROI image data.

In operation S220, the processor 101 may transmit the at least one piece of background image data during a first period according to the first sync signal, and in operation S230, the processor 101 may transmit the at least one piece of ROI image data during a second period according to the second sync signal. Here, the first period may denote an entire time period for generating an output image. The second period may denote a time period during which the at least one piece of background image data and the at least one piece of ROI image data are mixed by a mixer of the timing controller 111, the second period being included in the first period. For example, a starting time point of the second period may indicate a time point at which mixing of the at least one piece of background image data and the at least one piece of ROI image data is started according to the position of the ROI image in the background image.

According to some example embodiments, the processor 101 may transmit a first data control signal indicating a first valid transmission period to a memory, and the processor 101 may transmit, according to the first sync signal, the at least one piece of background image data output from the memory, to the timing controller 111 (e.g., the scaler of the timing controller 111), during the first valid transmission period included in the first period, and may stand by during a remaining period of the first period. For example, the first valid transmission period may be determined based on any one of the cycle of the first sync signal or the number of pixel lines transmitted during one cycle of the first sync signal.

According to some example embodiments, the processor 101 may transmit a second data control signal indicating a second valid transmission period to the memory, and the processor 101 may transmit, according to the second sync signal, the at least one piece of ROI image data output from the memory, to the timing controller 111 (e.g., the scaler of the timing controller 111), during the second valid transmission period included in the second period, and may stand by during a remaining period of the second period. For example, the second valid transmission period may be determined based on any one of the cycle of the second sync signal or the number of pixel lines transmitted during one cycle of the second sync signal.

Figure 5A:
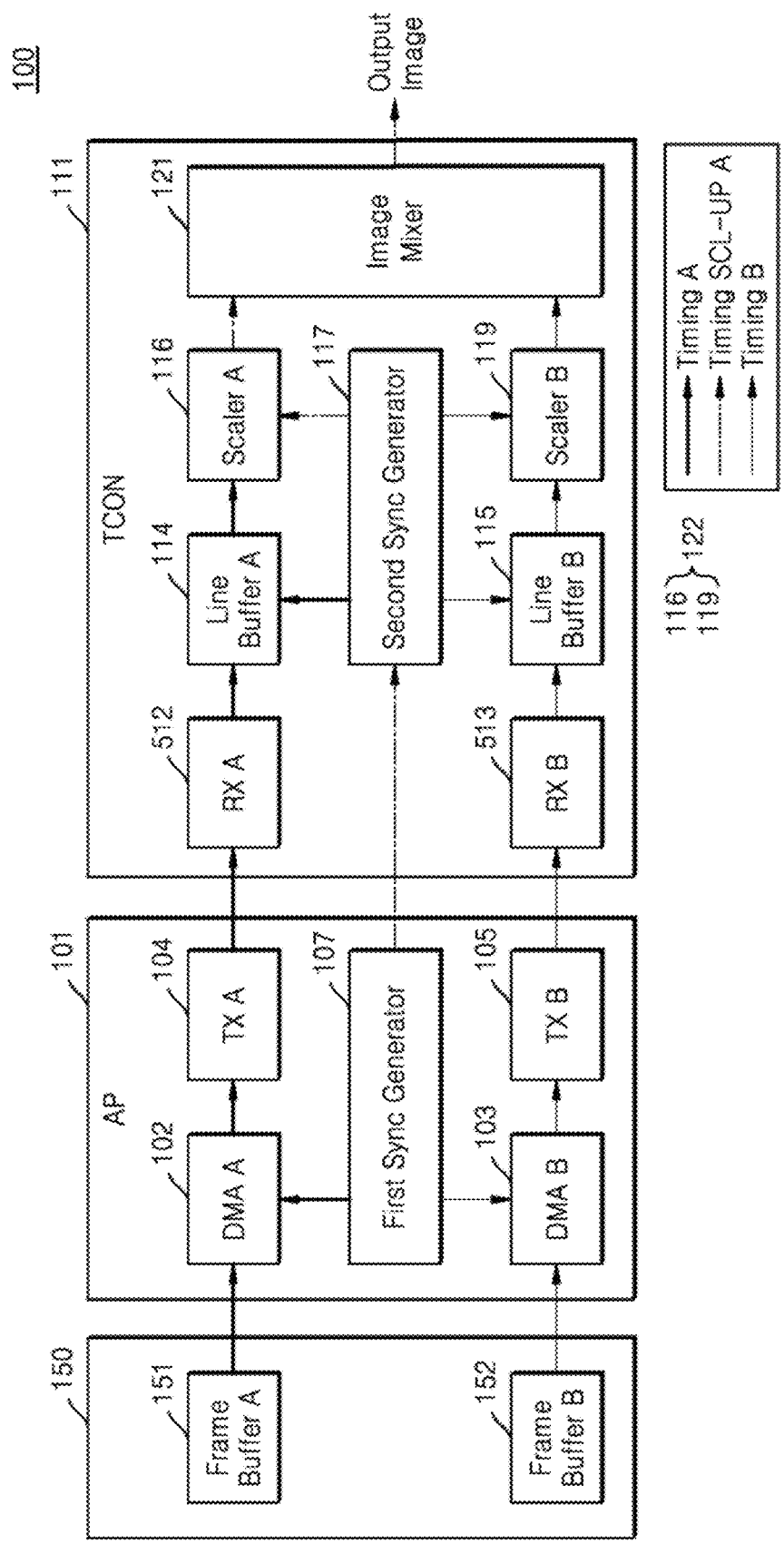
FIG. 5A is a block diagram for describing an operation of controlling a transmission timing of a background image and a region of interest (ROI) image, according to some example embodiments.

FIG. 5A is a block diagram for describing an operation of controlling a transmission timing of a background image and an ROI image, according to some example embodiments.

In detail, the block diagram of the display device 100 of FIG. 5A is based on a timing diagram of FIG. 5B below showing signals for controlling transmission timings of at least one piece of background image data and at least one piece of ROI image data.

Referring to FIG. 5A, the display device 100 of FIG. 2 may include the processor 101, the timing controller 111, and the memory 150.

The memory 150 according to some example embodiments may include a frame buffer A 151 and a frame buffer B 152 in order to generate a foveated image. The frame buffer A 151 may store background image data, which is a low-resolution image of a displayed object image, and the frame buffer B 152 may store ROI image data, which is a high-resolution image of the object image. That is, the at least one piece of background image data may be formed of (e.g., may entirely comprise) pixel value data corresponding to a low-resolution image, and the at least one piece of ROI image data may be formed of (e.g., may entirely comprise) pixel value data corresponding to a high-resolution image.

According to some example embodiments, the processor 101 may include a direct memory access (DMA) A circuit 102, a DMA B circuit 103, a transmission (TX) A circuit 104, a TX B circuit 105, and a first sync generator circuit 107.

According to some example embodiments, the timing controller (TCON) 111 may include a reception (RX) A circuit 512, an RX B circuit 513, a line buffer A 114, a line buffer B 115, a second sync generator circuit 117, and an image mixer 121. The timing controller 111 may further include a scaler A 116 and a scaler B 119. In some example embodiments, the scaler A 116 and the scaler B 119 may collectively define a single scaler 122 of the TCON 111, via which both a first sync signal and a second sync signal may be generated, and to which the processor 101 may transmit the at least one piece of background image data and the at least one piece of ROI image data that are output from the memory 150.

A timing A of FIG. 5A may be a transmission timing of the at least one piece of background image data and may be applied to the frame buffer A 151, the DMA A circuit 102, the TX A circuit 104, the RX A circuit 512, the line buffer A 114, and a scaler A 116 (e.g., an input timing of the at least one piece of background image data of the scaler A 116). Also, signals transmitted according to the timing A may include a first sync signal H-Sync A and a first data control signal DEN A with respect to the at least one piece of background image data of FIG. 5B.

A timing B of FIG. 5A may be a transmission timing of the at least one piece of ROI image data and may be applied to the frame buffer B 152, the DMA B circuit 103, the TX B circuit 105, the RX B circuit 513, the line buffer B 115, and a scaler B 119 (e.g., an input timing of the at least one piece of ROI image data of the scaler B 119). Also, signals transmitted according to the timing B may include a second sync signal H-Sync B and a second data control signal DEN B with respect to the at least one piece of ROI image data of FIG. 5B.

A timing SCL-UP A of FIG. 5A may be a transmission timing of the at least one piece of ROI image data scaled-up by the scaler A 116 and may be applied to the scaler A 116 (e.g., an output timing of the at least one piece of background image data scaled-up by the scaler A 116) and the image mixer 121 (e.g., an output timing of the image mixer 121). Also, signals transmitted according to the timing SCL-UP A may include a third sync signal H-Sync SCL-UP-A and a third data control signal DEN SCL-UP-A with respect to the scaled-up at least one piece of background image data of FIG. 5B.

Figure 5B:
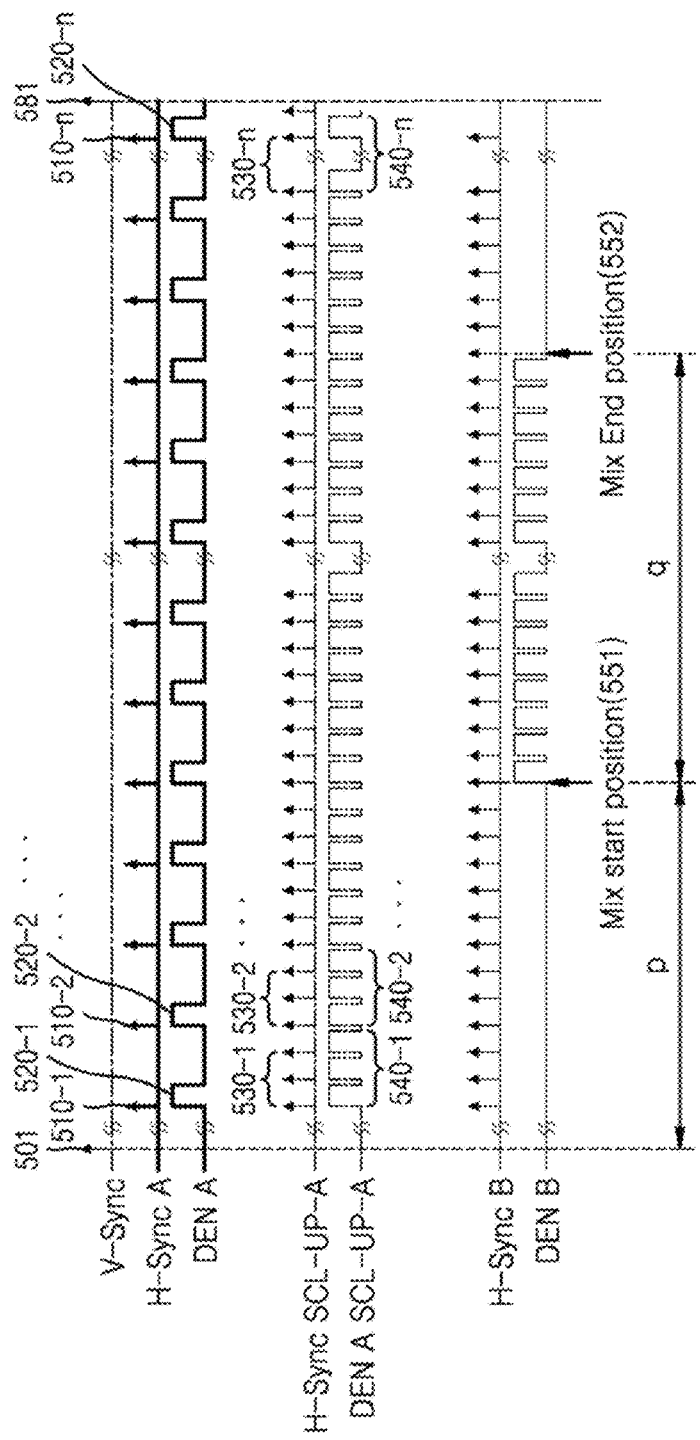
FIG. 5B is a timing diagram for describing the operation of controlling the transmission timing of the background image and the ROI image illustrated in FIG. 5A, according to some example embodiments.

FIG. 5B is a timing diagram for describing the operation of controlling the transmission timing of the background image and the ROI image illustrated in FIG. 5A, according to some example embodiments.

In detail, the timing diagram of FIG. 5B is with respect to control signals applied to each of the memory 150, the processor 101, and the timing controller 111 included in the display device 100 of FIG. 5A in order to perform the operation of controlling the transmission timings of the at least one piece of background image data and the at least one piece of ROI image data illustrated in FIG. 5A.

In FIGS. 5A and 5B, the at least one piece of background image data may denote pixel value data of a background image included in at least one pixel line (e.g., a row) of background image data, and the at least one piece of ROI image data may denote pixel value data of an ROI image included in at least one row line of the ROI image data.

Referring to FIGS. 5A and 5B, according to some example embodiments, the first sync generator circuit 107 of the processor 101 may generate and transmit, to the memory 150 and the timing controller 111, a frame sync signal V-Sync (e.g., a first frame sync signal 501 and a second frame sync signal 581), whenever one frame unit image is generated.

According to some example embodiments, the first sync generator circuit 107 may generate a first sync signal H-Sync A (e.g., a first sync signal 510-1 of a first line, a first sync signal 510-2 of a second line, . . . , and a first sync signal 510-n of an $N^{th}$ line in the background image data, where n is any natural number) to be synchronized to an input timing of the at least one piece of background image data of the scaler A 116 of the timing controller 111. Here, the first sync signal H-Sync A may denote a signal generated by synchronizing a data transmission timing of each pixel line (e.g., row) of the at least one piece of background image data to an input timing for each pixel line (e.g., row) of the at least one piece of background image data of the scaler A 116.

The first sync generator circuit 107 may generate the first data control signal DEN A (e.g., a first data control signal 520-1 of a first line, a first data control signal 520-2 of a second line, . . . , and a first data control signal 520-n of an $N^{th}$ line in the background image) indicating a first valid transmission period during which the at least one piece of background image data is actually transmitted and a first stand-by period during which the at least one piece of background image data is not transmitted, the first valid transmission period and the first stand-by period being included in a cycle of the first sync signal H-Sync A.

The first sync generator circuit 107 may determine the first valid transmission period by adjusting any one of the cycle of the first sync signal or the number of pixel lines transmitted during one cycle of the first sync signal and may control a transmission speed of the at least one piece of background image data according to the first valid transmission period. Thus, the first sync generator circuit 107 may control the transmission timing of the at least one piece of background image data through the controlling of the transmission speed according to the first valid transmission period.

The DMA A circuit 102 of the processor 101 may output (or read) the at least one piece of background image data from the frame buffer A 151 based on the first sync signal H-Sync A and the first data control signal DEN A received from the first sync generator circuit 107 and transmit the output (or read) at least one piece of background image data to the RX A circuit 512 of the TCON 111 through the TX A circuit 104. That is, the DMA A circuit 102 of the processor 101 may transmit the at least one piece of background image data based on the input timing of the at least one piece of background image data of the scaler A 116, by transmitting the at least one piece of background image data based on the first sync signal H-Sync A. For example, during a period during which the output image is generated, the processor 101 may transmit the at least one piece of background image data the scaler A 116 through the line buffer A 114 of the TCON 111.

For example, assuming that a time period during which a background image is displayed is 8 milliseconds (ms) in the output image of the timing controller 111, the processor 101 may transmit the background image data for 8 ms, based on the first sync signal H-Sync A and the first data control signal DEN A generated by the first sync generator circuit 107. That is, the processor 101 may control the transmission timing by adjusting a transmission speed of the at least one piece of background image data such that the at least one piece of background image data (e.g., one piece of row line data of the background image) is transmitted for 8 ms.

According to some example embodiments, the first sync generator circuit 107 may generate a second sync signal H-Sync B to be synchronized to an input timing of the at least one piece of ROI image data of the scaler B 119 of the TCON 111. Here, the second sync signal H-Sync B may denote a signal generated by synchronizing a data transmission timing of each pixel line (e.g., row) of the at least one piece of ROI image data to an input timing for each pixel line (e.g., row) of the at least one piece of ROI image data of the scaler B 119.

The first sync generator circuit 107 may generate the second data control signal DEN B indicating a second valid transmission period during which the at least one piece of ROI image data is actually transmitted and a second stand-by period during which the at least one piece of ROI image data is not transmitted, the second valid transmission period and the second stand-by period being included in a cycle of the second sync signal H-Sync B.

The first sync generator circuit 107 may determine the second valid transmission period by adjusting any one of the cycle of the second sync signal or the number of pixel lines transmitted during one cycle of the second sync signal and may control a transmission speed of the at least one piece of ROI image data according to the second valid transmission period. Thus, the first sync generator circuit 107 may control the transmission timing of the at least one piece of ROI image data through the controlling of the transmission speed according to the second valid transmission period.

The first sync generator circuit 107 may control the transmission timing of the at least one piece of ROI image data based on a mixing timing (or a mixing period) of the at least one piece of background image data and the at least one piece of ROI data via the TCON 111. For example, when a mixing start time point 551 of the at least one piece of background image data and the at least one piece of ROI image data is after p seconds have passed (e.g., elapsed) after transmission of the background image data is started, and q seconds have passed (e.g., elapsed) between the mixing start time point 551 and a mixing end time point 552, the first sync generator circuit 107 may start transmitting the at least one piece of ROI image data based on the second data control signal DEN B after p seconds have passed after transmission of the background image data is started and may transmit the at least one piece of ROI image data for q seconds.

For example, assuming that an ROI image is displayed for 2 ms after 3 ms have passed after a background image is started to be displayed in an output image of the TCON 111, the processor 101 may transmit the ROI image data for 2 ms after 3 ms have passed after the background image data is started to be transmitted, based on the second sync signal H-Sync B and the second data control signal DEN B generated by the first sync generator circuit 107. That is, the processor 101 may control the transmission timing of the ROI image data by adjusting a transmission speed of the at least one piece of ROI image data such that the at least one piece of ROI image data (e.g., one piece of row line data of the ROI image) is transmitted for 2 ms.

The DMA B circuit 103 of the processor 101 may output (or read) the at least one piece of ROI image data from the frame buffer B 152 based on the second sync signal H-Sync B and the second data control signal DEN B received from the first sync generator circuit 107 and may transmit the output (or read) at least one piece of ROI image data to the RX B circuit 513 of the TCON 111 through the TX B circuit 105. That is, the DMA B circuit 103 of the processor 101 may transmit the at least one piece of ROI image data based on an input timing of the at least one piece of ROI image data via the scaler B 119 by transmitting the at least one piece of ROI image data based on the second sync signal H-Sync B and the second data control signal DEN B. For example, the processor 101 may transmit the at least one piece of ROI image data to the scaler B 119 through the line buffer B 115 of the TCON 111 during a mixing period of the at least one piece of background image data and the at least one piece of ROI image data.

The line buffer A 114 of the TCON 111 may receive, from the RX A circuit 512, at least one piece of ROI image data and may store the at least one piece of ROI image data. Based on the first sync signal H-Sync A and the first data control signal DEN A received from a second sync generator circuit 117, the line buffer A 114 may output the received at least one piece of ROI image data to the scaler A 116 correspondingly to an input timing of the at least one piece of ROI image data via the scaler A 116. The line buffer A 114 may be formed as a size (e.g., the line buffer A 114 may have a buffer memory capacity) corresponding to the at least one piece of background image data (e.g., pixel value data of one pixel line in the at least one piece of background image data) transmitted during one cycle of the first sync signal. For example, the line buffer A 114 may have a size that corresponds to (e.g., matches) a size of the at least one piece of background image data transmitted during one cycle of the first sync signal. For example, the line buffer A 114 may receive the at least one piece of background image data from the processor 101 and transmit the at least one piece of background image data to the scaler A 116, during a period of generating an output image.

The line buffer B 115 may receive the at least one piece of ROI image data from the RX B circuit 513 and may store the at least one piece of ROI image data. Based on the second sync signal H-Sync B and the second data control signal DEN B received from the second sync generator circuit 117, the line buffer B 115 may output the received at least one piece of ROI image data to the scaler B 119 correspondingly to the input timing of the at least one piece of ROI image data via the scaler B 119. The line buffer B 115 may be formed as a size (e.g., the line buffer B 115 may have a buffer memory capacity) corresponding to the at least one piece of ROI image data (e.g., pixel value data of one pixel line in the at least one piece of ROI image data) transmitted during one cycle of the first sync signal. For example, the line buffer B 115 may have a size that corresponds to (e.g., matches) a size of the at least one piece of ROI image data transmitted during one cycle of the second sync signal. For example, the line buffer B 115 may receive the at least one piece of ROI image data from the processor 101 and transmit the at least one piece of ROI image data to the scaler B 119, during a period of generating an output image.

The second sync generator circuit 117 of the TCON 111 may generate a third sync signal H-Sync SCL-UP-A (e.g., a third sync signal 530-1 of a first line, a third sync signal 530-2 of a second line, . . . , and a third sync signal 530-$n$ of an $N^{th}$ line in the scaled-up ROI image data) to be synchronized to the input timing of the at least one piece of ROI image data via the scaler A 116, based on the received first sync signal H-Sync A and first data control signal DEN A. Here, the third sync signal H-Sync SCL-UP-A may denote a signal generated by synchronizing a transmission timing of each pixel line (e.g., row) of the scaled-up at least one piece of ROI image data to an output timing for each pixel line (e.g., row) of the ROI image data via the scaler A 116.

The second sync generator circuit 117 may generate the third sync signal H-Sync SCL-UP-A by scaling up the first sync signal H-Sync A. For example, the second sync generator circuit 117 may generate the third sync signal H-Sync SCL-UP-A 530-1 by scaling up the first sync signal H-Sync A 510-1 of the first line in the ROI image data three times and generate the third sync signal H-Sync SCL-UP-A 530-2 by scaling up the first sync signal H-Sync A 510-2 of the second line three times.

The second sync generator circuit 117 may generate a third data control signal DEN SCL-UP-A (e.g., a third data control signal 540-1 of a first line, a third data control signal 540-2 of a second line, . . . , and a third data control signal 540-$n$ of an $N^{th}$ line in the scaled-up ROI image data) indicating a third valid transmission period during which the at least one piece of ROI image data is actually transmitted and a third stand-by period during which the at least one piece of ROI image data is not transmitted, the third valid transmission period and the third stand-by period being included in a cycle of the third sync signal H-Sync SCL-UP-A.

The second sync generator circuit 117 may determine the third valid transmission period by adjusting any one of the cycle of the third sync signal or the number of pixel lines transmitted during one cycle of the third sync signal and may control a transmission speed of the scaled-up at least one piece of ROI image data according to the third valid transmission period. Thus, the second sync generator circuit 117 may control a transmission timing of the scaled-up at least one piece of ROI image data through the controlling of the transmission speed according to the third valid transmission period.

The second sync generator circuit 117 may transmit the generated third sync signal H-Sync SCL-UP-A and third data control signal DEN SCL-UP-A to the scaler A 116 and may transmit the second sync signal H-Sync B and the second data control signal DEN B received from the first sync generator circuit 107 to the scaler B 119.

The scaler A 116 may scale up the received at least one piece of background image data to correspond to a size of an output image and may transmit the scaled-up at least one piece of background image data to the image mixer 121 according to the third sync signal H-Sync SCL-UP-A and the third data control signal DEN SCL-UP-A. The scaler B 119 may scale up the received at least one piece of ROI image data to correspond to a size of an output image and may transmit the scaled-up at least one piece of ROI image data to the image mixer 121 according to the second sync signal H-Sync B and the second data control signal DEN.

The image mixer 121 may generate the output image (e.g., a foveated image) by mixing the at least one piece of background image data that is input based on the third sync signal H-Sync SCL-UP-A and the third data control signal DEN SCL-UP-A and the at least one piece of ROI image data that is input based on the second sync signal H-Sync B and the second data control signal DEN B. The image mixer 121 may transmit the output image to be displayed to a user via, for example a display panel DP of the display device 100 as shown in at least FIG. 2.

The display device according to some example embodiments may transmit the at least one piece of background image data and the at least one piece of ROI image data according to the first sync signal and the second sync signal synchronized to the input timing of the at least one piece of background image data and the at least one piece of ROI image data of the timing controller (e.g., the scaler A 116 and the scaler B 119), and thus, may generate a foveated image without an intermediate buffer for adjusting a mixing timing. Therefore, according to some example embodiments, the display device (or the wearable display device) may have a reduced size and reduced power consumption due to the reduction of the intermediate buffer. For example, a functionality of the display device 100 may be improved, including an improvement in power consumption efficiency and/or compactness, based on the display device 100 being configured to transmit the at least one piece of background image data and the at least one piece of ROI image data to the TCON 111 according to the first sync signal H-Sync A and the second sync signal H-Sync B, respectively. For example, a functionality of the display device 100 may be improved, including an improvement in power consumption efficiency and/or compactness, based on the display device 100 being configured to transmit the at least one piece of background image data and the at least one piece of ROI image data to the TCON 111 based on the input timing of the at least one piece of background image data of the scaler A 116 and the input timing of the at least one piece of ROI image data of the scaler B 119, respectively. As a result of being configured to transmit the at least one piece of background image data and the at least one piece of ROI image data to the TCON 111 as described above, the display device 100 may omit an intermediate buffer for adjusting the mixing timing based on such operation and thereby reducing power consumption of the display device 100 and reducing display device 100 size due to omitting the intermediate buffer. Because the intermediate buffer may have a greater size (e.g., memory capacity) than the line buffers A and B 114 and 115 which have respective sizes that may correspond to respective sizes of a piece of a background image and a piece of an ROI image, the omission of the intermediate buffer from the display device 100 may result in a reduction in power consumption and size of the display device 100.

Figure 6:
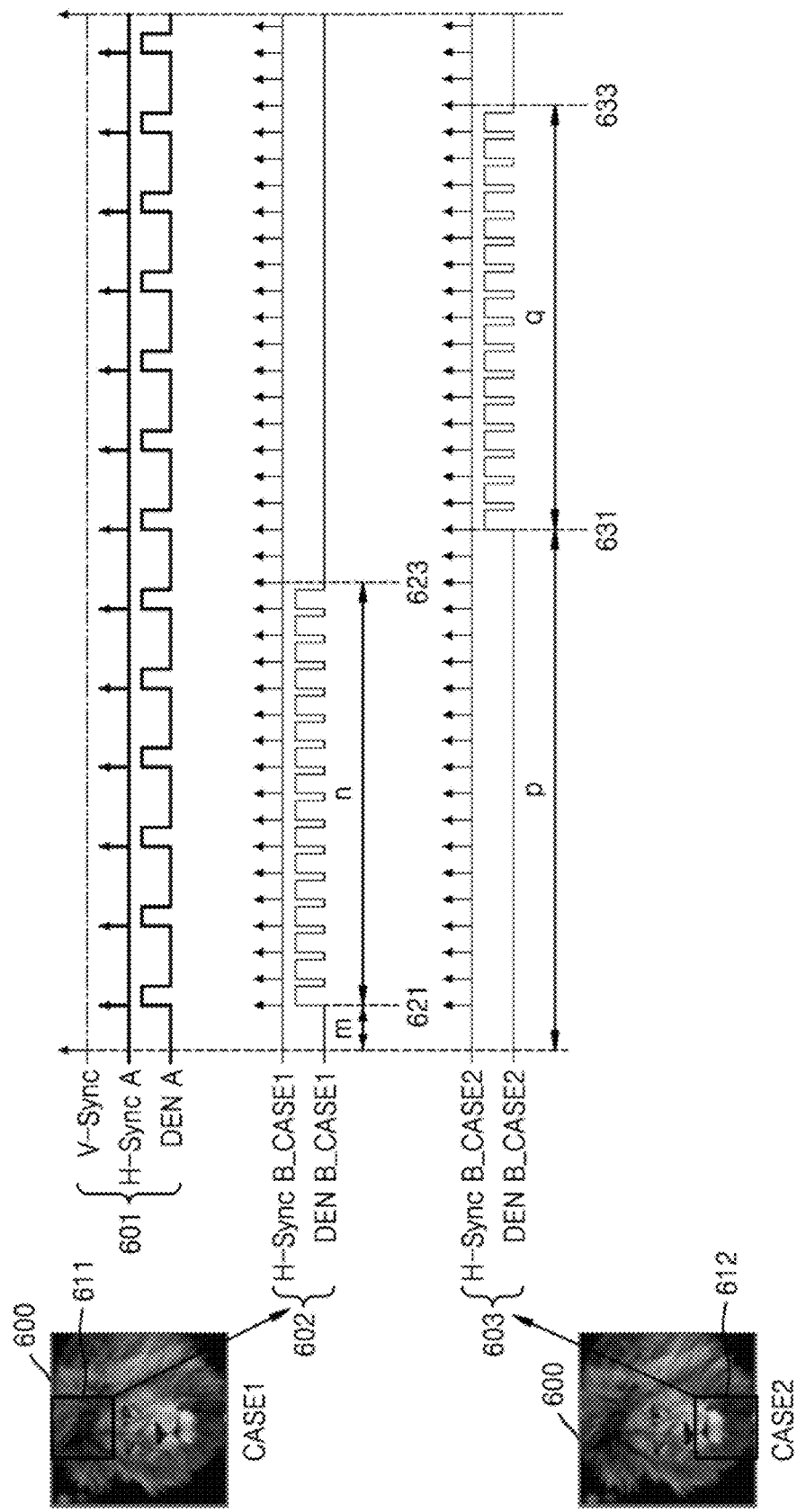
FIG. 6 is a timing diagram for describing an operation of controlling a transmission timing of a background image and an ROI image, based on a mixing timing of the background image and the ROI image, according to some example embodiments.

FIG. 6 is a timing diagram for describing an operation of controlling a transmission timing of a background image and an ROI image, based on a mixing timing of the background image and the ROI image, according to some example embodiments.

In detail, FIG. 6 is a view for describing an operation, performed by the processor 101 of the display device 100 of FIG. 2, of controlling transmission timings of at least one piece of background image data and at least one piece of ROI image data based on a mixing timing of the at least one piece of background image data and the at least one piece of ROI image data via the timing controller 111.

Referring to FIG. 6, as described above with reference to FIGS. 5A and 5B, a first timing diagram 601 is with respect to a first sync signal H-Sync A and a first data control signal DEN A with respect to a background image 600. A second timing diagram 602 is with respect to a second sync signal H-Sync B_CASE1 of a first case and a second data control signal DEN B_CASE1 of the first case with respect to an ROI image 611 of the first case (e.g., a first ROI image). A third timing diagram 603 is with respect to a second sync signal H-Sync B_CASE2 of a second case and a second data control signal DEN B_CASE2 of the second case with respect to an ROI image 612 of the second case (e.g., a second ROI image).

In the first case, it is assumed that a time point after "m seconds" have passed after the background image 600 is started to be output in an output image is a first mixing start time point 621, and a time point after the ROI image is output for "n seconds" is a first mixing end time point 623, where "m" and "n" may each independently be any number. As described above with reference to FIGS. 5A and 5B, the processor 101 of the display device 100 may control the transmission timings of the at least one piece of background image data and the at least one piece of ROI image data, based on a mixing timing of the background image 600 and the first ROI image 611, that is, an input timing of the at least one piece of background image data and the at least one piece of ROI image data via a mixer of the timing controller 111.

For example, the processor 101 may control the transmission timing of the at least one piece of ROI image data such that, after the at least one piece of ROI image data is started to be transmitted to the timing controller 111 after "m seconds" after the background image 600 is started to be output in the output image, the at least one piece of ROI image data is transmitted during "n seconds," during which the background image 600 and the first ROI image 611 are mixed, and the transmission of the at least one piece of ROI image data is stopped after "m+n seconds" after the background image 600 is started to be output in the output image.

In the second case, it is assumed that a time point after "p seconds" after the background image 600 is started to be output in an output image is a second mixing start time point 631, and a time point after the ROI image is output for "q seconds" is a second mixing end time point 633. As described above with reference to FIGS. 5A and 5B, the processor 101 of the display device 100 may control the transmission timings of the at least one piece of background image data and the at least one piece of ROI image data, based on a mixing timing of the background image 600 and the second ROI image 612, that is, an input timing of the at least one piece of background image data and the at least one piece of ROI image data via the mixer of the timing controller 111.

For example, the processor 101 may control the transmission timing of the at least one piece of ROI image data such that, after the at least one piece of ROI image data is started to be transmitted to the timing controller 111 after "p seconds" after the background image 600 is started to be output in the output image, the at least one piece of ROI image data is transmitted during "q seconds," during which the background image 600 and the second ROI image 612 are mixed, and the transmission of the at least one piece of ROI image data is stopped after "p+q seconds" after the background image 600 is started to be output in the output image.

The display device according to some example embodiments may transmit the at least one piece of background image data and the at least one piece of ROI image data according to the first sync signal and the second sync signal synchronized to the mixing timing of the at least one piece of background image data and the at least one piece of ROI image data of the timing controller (e.g., the mixer), and thus, may generate a foveated image without an intermediate buffer for adjusting the mixing timing.

Figure 7:
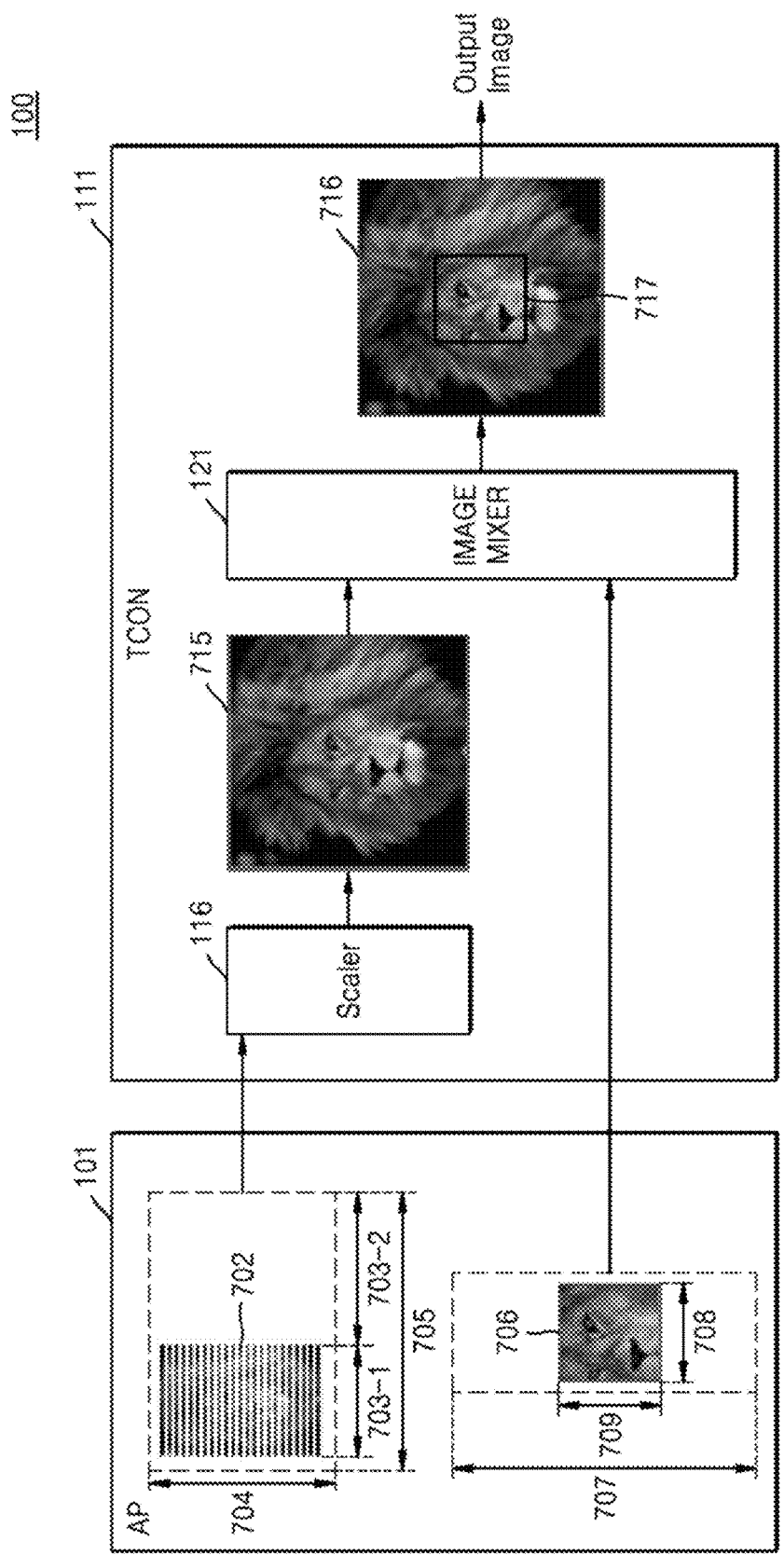
FIG. 7 is a view for describing an operation, performed by a display device, of generating a foveated image, according to some example embodiments.

FIG. 7 is a view for describing an example of an operation, performed by a display device, of generating a foveated image, according to some example embodiments.

In detail, an operation, performed by the processor 101 of the display device 100 of FIG. 2, of controlling a transmission timing by adjusting a transmission speed of the at least one piece of background image data and the at least one piece of ROI image data is described.

Referring to FIG. 7, the display device 100 may include the processor 101 and the TCON 111 including a scaler 116 configured to scale up a background image 702, an image mixer 121 configured to mix the scaled-up background image 715 and an ROI image 706 and generate an output image. An ROI 717 of a user in an output image may be output as a high resolution, and a remaining area 716 other than the ROI may be output as a low resolution.

The processor 101 may adjust a transmission speed of the at least one piece of background image data and the at least one piece of ROI image data by using a first or second sync signal generated to be synchronized to an input timing of the at least one piece of background image data and the at least one piece of ROI image data via the scaler 116.

The processor 101 may adjust the transmission speed of the at least one piece of background image data and the at least one piece of ROI image data by using the first or second sync signal generated to be synchronized to a mixing timing of the at least one piece of background image data and the at least one piece of ROI image data via the image mixer 121.

According to some example embodiments, the processor 101 may adjust a cycle 705 of the first sync signal with respect to the at least one piece of background image data in order to adjust the transmission speed of the background image 702 and may adjust a cycle 708 of the second sync signal with respect to the at least one piece of ROI image data in order to adjust the transmission speed of the ROI image 706. Here, the cycle of the first sync signal may correspond to a period during which pixel value data of one pixel line (e.g., a row) in the background image 702 is transmitted, and the cycle of the second sync signal may correspond to a period during which pixel value data of one pixel line in the ROI image 706 is transmitted.

For example, the processor 101 may relatively slowly transmit the at least one piece of background image by increasing the cycle 705 of the first sync signal and may relatively quickly transmit the at least one piece of ROI image data by decreasing the cycle 708 of the second sync signal, thereby controlling the transmission timings of the at least one piece of background image data and the at least one piece of ROI image data to correspond to the input timing of the at least one piece of background image data and the at least one piece of ROI image data of the timing controller 111 or the mixing timing of the at least one piece of background image data and the at least one piece of ROI image data of the image mixer 121.

According to some example embodiments, the processor 101 may control the transmission timing such that the at least one piece of background image data is actually transmitted during a first valid transmission period 703-1, and the at least one piece of background image data is not transmitted during a first stand-by period 703-2, the first valid transmission period 703-1 and the first stand-by period 703-2 being included in an entire transmission period 704 of the background image 702, in order to adjust the transmission speed of the background image 702.

According to some example embodiments, the processor 101 may control the transmission timing such that the ROI image 706 is transmitted only during a mixing period 709 during which the at least one piece of background image data and the at least one piece of ROI image data are mixed, the mixing period 709 being included in an entire transmission period 707 of the ROI image 706, in order to adjust the transmission speed of the ROI image 106.

The display device according to some example embodiments may control the transmission timings to transmit the at least one piece of background image data and the at least one piece of ROI image data by synchronizing the transmission timings to the input timing of the at least one piece of background image data and the at least one piece of ROI image data of the timing controller or the mixing timing of the at least one piece of background image data and the at least one piece of ROI image data of the timing controller, and thus, may generate a foveated image without an intermediate buffer. Therefore, according to some example embodiments, the display device (or the wearable display device) may have a reduced size and reduced power consumption, and thus improved functionality, due to the reduction of the intermediate buffer.

Figure 8:
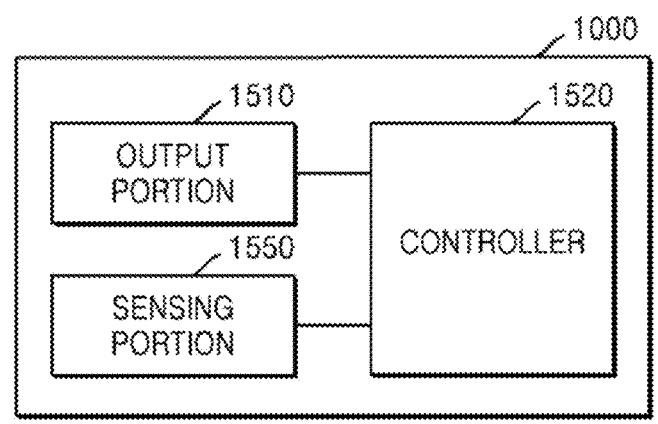
FIGS. 8 and 9 are block diagrams of a wearable electronic device according to some example embodiments.
Figure 9:
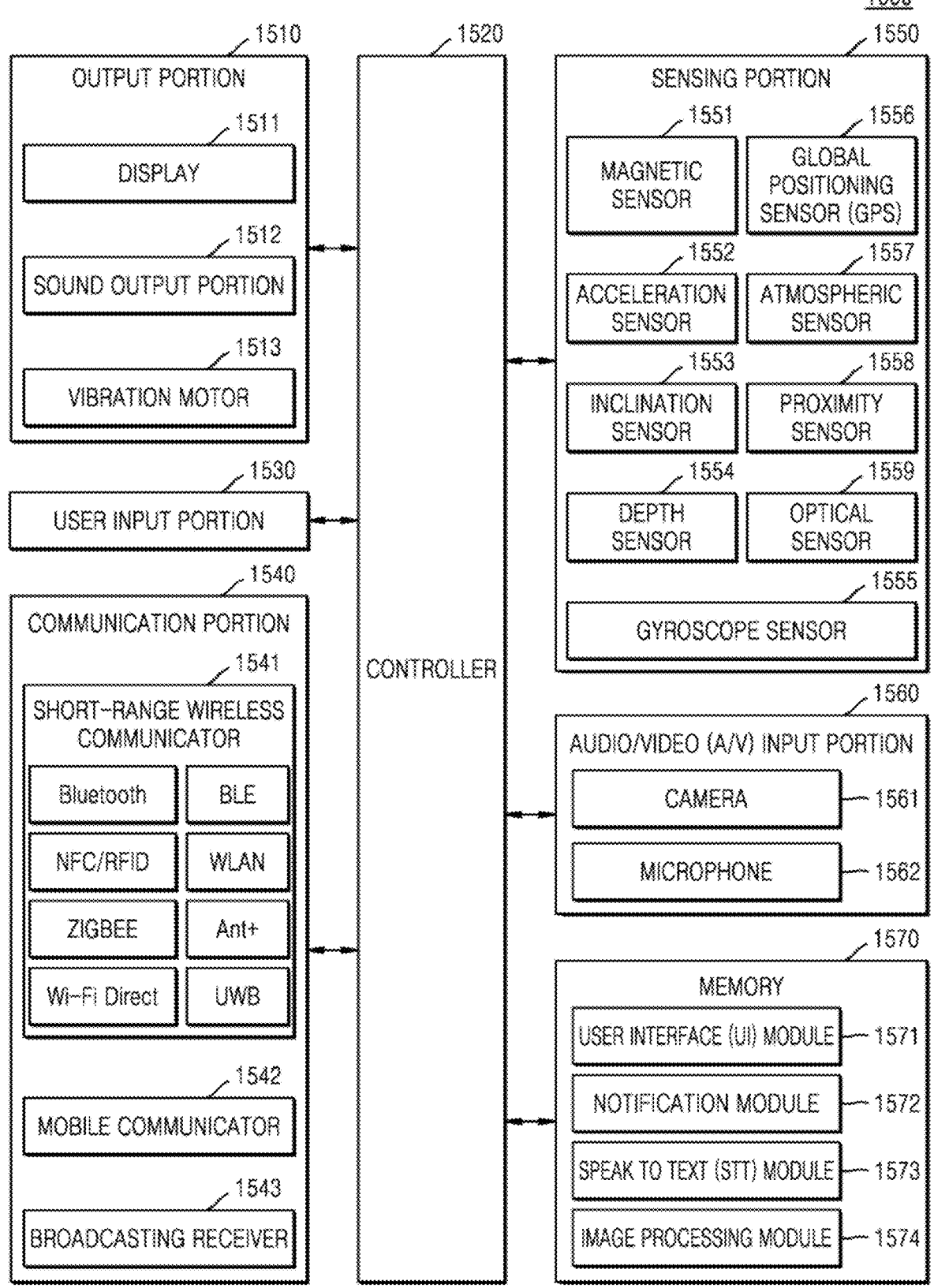

FIGS. 8 and 9 are block diagrams of a wearable electronic device 1000 according to some example embodiments.

Referring to FIG. 8, the wearable electronic device 1000 according to some example embodiments may include an output portion 1510, a sensing portion 1550, and a controller 1520. However, the wearable electronic device 1000 may be realized by including more elements than the elements illustrated in FIG. 7. Also, each element included in the wearable electronic device 1000 may be arranged on a frame which is used for the wearable electronic device 1000 to be worn on the head of a user. The wearable electronic device 1000 of FIG. 8 may correspond to the display device 100 of FIG. 2, FIG. 5A, or the display device 100 of any of the example embodiments.

According to some example embodiments, the output portion 1510 may display an image to a user based on information processed by the wearable electronic device 1000. A display 1511 may display a foveated image in which a portion corresponding to a gaze area of the user (e.g., an ROI of the user) is realized as a high resolution (e.g., a high-resolution portion of the foveated image), and a remaining area other than the gaze area is realized as a low resolution (e.g., a low-resolution portion of the foveated image).

The sensing portion 1550 (e.g., a sensor) may obtain information about (e.g., information associated with) a body part of the user or information about (e.g., information associated with) a gesture of the user. The information about the body part of the user may include an image with respect to the body part, and the information about the gesture of the user may include an image obtained by photographing a body part of the user taking a gesture.

For example, the sensing portion 1550 may obtain an image by photographing an eye or a hand of the user. The sensing portion 1550 may sense a gaze of the user based on the image obtained by photographing the eye of the user. The sensing portion 1150 may correspond to the at least one sensor 118 of the display device 100 of FIG. 2, or at least one sensor of any example embodiment of the display device.

The controller 1520 according to some example embodiments may control general operations of the wearable electronic device 1000. For example, the controller 1520 may execute programs stored in a memory 1570 of FIG. 9 to be described below, to control the output portion 1510, a user input portion 1530, a communication portion 1540, the sensing portion 1550, an audio/video (A/V) input portion 1560, and the memory 1570 of FIG. 9.

According to some example embodiments, the controller 1520 may perform a control operation to generate an ROI image by identifying, based on a result of sensing by the sensing portion 1550, a gaze area of the user (e.g., an ROI of the user) from among a plurality of areas included in a displayed image. The controller 1520 may control a first sync signal and a second sync signal to be generated to be synchronized to an input timing of at least one piece of background image data and at least one piece of ROI image data via the output portion 1510 (e.g., the timing controller 111) and may control a first data control signal and a second data control signal to control a transmission speed of the at least one piece of background image data and the at least one piece of ROI image data to be generated. The controller 1520 may control transmission timings of the at least one piece of background image data and the at least one piece of ROI image data to be synchronized to the input timing of the at least one piece of background image data and the at least one piece of ROI image data via the output portion 1510 (e.g., the timing controller 111), by using the first sync signal, the second sync signal, the first data control signal, and the second data control signal.

Referring to FIG. 9, the wearable electronic device 1000 according to some example embodiments may further include the user input portion 1530, the communication portion 1540, the sensing portion 1550, the A/V input portion 1560, and the memory 1570, in addition to the output portion 1510 and the controller 1520. The sensing portion 1550 may also be referred to as a sensor portion. These elements may be connected to one another via a bus. Hereinafter, the elements are sequentially described.

The output portion 1510 may be configured to output an audio signal, a video signal, or a vibration signal, and the output portion 1510 may include the display 1511, a sound output portion 1512, a vibration motor 1513, etc.

The display 1511 may display information processed by the wearable electronic device 1000. For example, the display 1511 may display content (notification message information) corresponding to a notification event. Here, the display 1511 may display the content corresponding to the notification event as augmented reality (AR), mixed reality (MR), or virtual reality (VR). Also, the display 1511 may display an indicator indicating an occurrence of a notification event.

The display 1511 may display a list of non-output contents. The list of non-output contents may include notification content not output when a notification event occurs and notification content partially output when a notification event occurs.

When the display 1511 and a touch pad form a layered structure to be realized as a touch screen, the display 1511 may be used not only as an output device but also as an input device. The display 1511 may include at least one of a liquid crystal display, a thin-film transistor-liquid crystal display, an organic light-emitting diode, a flexible display, a three-dimensional (3D) display, and an electrophoretic display. Also, according to a form in which the wearable electronic device 1000 is realized, the wearable electronic device 1000 may include at least two displays 1511.

The sound output portion 1512 may output audio data received from the communication portion 1540 or stored in the memory 1570. Also, the sound output portion 1512 may output a sound signal related to functions performed in the wearable electronic device 1000 (e.g., call signal reception sound, message reception sound, notification sound, etc.). The sound output portion 1512 may include a speaker, a buzzer, etc.

The vibration motor 1513 may output a vibration signal. For example, the vibration motor 1513 may output a vibration signal corresponding to an output of audio data or video data (for example, call signal reception sound, message reception sound, etc.). Also, the vibration motor 1513 may output a vibration signal when a touch on the touch screen is input.

The output portion 1510 may provide content corresponding to a notification event, according to a provision method determined based on user's motion pattern information.

In general, the controller 1520 may control general operations of the wearable electronic device 1000. For example, the controller 1520 may execute programs stored in the memory 1570 to generally control the output portion 1510, the user input portion 1530, the communication portion 1540, the sensing portion 1550, the A/V input portion 1560, etc.

The controller 1520 may determine whether a user is wearing the wearable electronic device 1000 based on at least one sensor included in the wearable glasses, and when it is determined that the user is wearing the wearable glasses, the controller 1520 may obtain user's gaze pattern information.

The controller 1520 may extract a user's ROI from a displayed image or video, based on the user's gaze pattern information, and may control the display 1511 to generate an ROI image and display the generated ROI image to the user.

The controller 1520 may control the display 1511 to generate first and second sync signals and first and second data control signals to be synchronized to an input timing of at least one piece of background image data and at least one piece of ROI image data via the timing controller of the display 1511.

The controller 1520 may adjust transmission timings of the at least one piece of background image data and the at least one piece of ROI image data by adjusting cycles of the first and second sync signals and the number of pixel lines (or pixel rows) of image data transmitted during one cycle of each of the first and second sync signals.

The controller 1520 may adjust transmission timings of the at least one piece of background image data and the at least one piece of ROI image data by adjusting a transmission speed of the at least one piece of background image data and the at least one piece of ROI image data by controlling a valid transmission period during which the at least one piece of background image data and the at least one piece of ROI image data are actually transmitted, the valid transmission period being included in the cycle of each of the first and second sync signals.

The controller 1520 may adjust transmission timings of the at least one piece of background image data and the at least one piece of ROI image data to be synchronized to a mixing timing of the at least one piece of background image data and the at least one piece of ROI image data via a mixer of the display 1511.

The controller 1520 may determine, based on a signal output by at least one sensor included in the sensing portion 1550, whether or not a user is wearing wearable glasses, and when it is determined that the user is wearing the wearable glasses, may control the sensing portion 1550 to sense a gaze of the user.

The user input portion 1530 may denote a device via which a user may input data for controlling the wearable electronic device 1000. For example, the user input portion 1530 may include a key pad, a dome switch, a touch pad (a touch capacitance method, a pressure resistive-layer method, an infrared sensing method, a surface ultrasonic conduction method, an integral tension measurement method, a piezo effect method, etc.), a jog wheel, a jog switch, etc., but is not limited thereto.

The user input portion 1530 may receive a user input of requesting an output of notification content.

The user input portion 1530 may receive a first user input of requesting an output of the entire content. The first user input may include at least one of a motion input, a touch input, a key input, a voice input, and multi-inputs, but is not limited thereto. According to some example embodiments, the first user input of requesting the output of the entire notification content may be pre-set. For example, the user may set a head-up motion by which a user lifts his/her head up as the first user input of requesting the output of the entire notification content.

The user input portion 1530 may receive a second user input of requesting partial prevention of an output of notification content. The second user input may vary.

The user input portion 1530 may receive a user input of requesting a list of non-output contents. The user input of requesting the list of non-output contents may include an input of touching a certain area of a glasses frame, an input of selecting a certain button included in the glasses frame, a voice input of requesting the list of non-output contents, a head-up motion input lifting a user's head, etc., but is not limited thereto.

The user input portion 1530 may receive a user input of requesting transmission of notification content to an external device. Here, the user input portion 1530 may receive an input of selecting the external device to transmit the notification content to. For example, the user input portion 1530 may receive an input of selecting a smart watch and an input of requesting transmission of notification content to the smart watch.

The communication portion 1540 may include one or more components configured to enable communication between the wearable electronic device 1000 and the mobile terminal 200, between the wearable electronic device 1000 and the server 300, or between the wearable electronic device 1000 and an external wearable device. For example, the communication portion 1540 may include a short-range wireless communicator 1541, a mobile communicator 1542, and a broadcasting receiver 1543.

The short-range wireless communicator 1541 may include a Bluetooth communicator, a BLE communicator, a near-field communicator, a WLAN (WiFi) communicator, a Zigbee communicator, an infrared data association (IrDA) communicator, a WFD communicator, a UWB communicator, an Ant+ communicator, etc., but is not limited thereto.

The mobile communicator 1542 may transceive a wireless signal with at least one of a base station, an external terminal, and a server on a mobile communication network. Here, the wireless signal may include a sound call signal, a video-telephony call signal, or data of various forms according to transmission and reception of text/a multimedia message.

The broadcasting receiver 1543 may receive a broadcasting signal and/or broadcasting-related information from the outside through a broadcasting channel. The broadcasting channel may include a satellite channel, a ground wave channel, etc. According to some example embodiments, the wearable electronic device 1000 may not include the broadcasting receiver 1543.

The communication portion 1540 may receive notification message information.

The communication portion 1540 may request user's motion pattern information from an external device connected to the wearable electronic device 1000 and may receive the user's motion pattern information from the external device. Here, the communication portion 1540 may request the user's motion pattern information by transmitting acceleration information, inclination information, position information, etc. measured by the wearable electronic device 1000.

The communication portion 1540 may transmit a captured external image to the mobile terminal 200 or the server 300 and may request an analysis on the external image. The communication portion 1540 may receive at least one of change amount information of the external image, color information of the external image, and object information included in the external image from the mobile terminal 200 or the server 300.

The sensing portion 1550 may sense a state of the wearable electronic device 1000, an ambient state of the wearable electronic device 1000, a state of a user wearing the wearable electronic device 1000, a motion of the user, etc. and may transmit the sensed information to the controller 1520. For example, the sensing portion 1550 may sense a gaze of the user in order to extract an ROI of the user from a displayed image and may output a signal related to the gaze of the user to the controller 1520. Here, the signal may be an electric signal.

The sensing portion 1550 may include, but is not limited to, at least one of a magnetic sensor 1551, an acceleration sensor 1552, an inclination sensor 1553, a depth sensor 1554, a gyroscope sensor 1555, a position sensor (for example, a global positioning sensor (GPS) 1556), an atmospheric sensor 1557, a proximity sensor 1558, and an optical sensor 1559. The sensing portion 1550 may include a temperature sensor, an illumination sensor, a pressure sensor, an iris recognition sensor, etc. A function of each sensor may be intuitively inferred by one of ordinary skill in the art from its name, and thus, its detailed description will not be given.

The A/V input portion 1560 may be configured to input an audio signal or a video signal and may include a camera (an image sensor) 1561 and a microphone 1562. The camera (the image sensor) 1561 may obtain an image frame, such as a still image or a motion image, in a video telephony mode or a photographing mode. An image captured by the camera (the image sensor) 1561 may be processed by the controller 1520 or an additional image processor (not shown).

The image framed processed by the camera (the image sensor) 1561 may be stored in the memory 1570 or may be transmitted to the outside through the communication portion 1540. The camera (the image sensor) 1561 may include two cameras (image sensors) according to the specification of the wearable electronic device 1000.

The microphone 1562 may receive an external sound signal and process the sound signal into electrical sound data. For example, the microphone 1562 may receive a sound signal from an external device or a speaker. The microphone 1562 may use various noise removal algorithms for removing noise occurring in a process of receiving the external sound signal.

The memory 1570 may store a program for processing and controlling by the controller 1520 and may store input/output data (e.g., a list of non-output contents, a list of previously output contents, a captured image, biometric information, user's schedule information, user's life pattern information, etc.).

The memory 1570 may store at least one piece of background image data and at least one piece of ROI image data to generate a foveated image. The memory 1570 may correspond to the memory 150 of the display device 100.

The memory 1570 may include at least one type of storage medium from among a flash memory type, a hard disk type, a multimedia card micro type, a card type memory (e.g., an SD or XD memory), random-access memory (RAM), static RAM (SRAM), read-only memory (ROM), electrically erasable programmable (ROM) (EEPROM), programmable ROM (PROM), a magnetic memory, a magnetic disk, and an optical disk. Also, the wearable electronic device 1000 may operate a web storage or a cloud server performing a storage function of the memory 1570 on the Internet.

The programs stored in the memory 1570 may be classified into a plurality of modules according to their functions. For example, the programs may be classified into a user interface (UI) module 1571, a notification module 1572, a speak to text (STT) module 1573, an image processing module 1574, etc.

The UI module 1571 may provide a specialized UI, a specialized graphics user interface (GUI), etc. which are synchronized with the wearable electronic device 1000 according to an application. The notification module 1572 may generate a signal for notifying an occurrence of an event of the wearable electronic device 1000. The notification module 1572 may output a notification signal in the form of a video signal through the display 1511, in the form of an audio signal through the sound output portion 1512, or in the form of a vibration signal through the vibration motor 1513.

The STT module 1573 may convert a voice included in multimedia content to text, thereby generating a transcript corresponding to the multimedia content.

The image processing module 1574 may obtain object information, edge information, atmosphere information, color information, etc. included in a captured image through an analysis on the captured image.

The method according to some example embodiments may be realized as a program command which is executable by various computing devices and may be recorded on a computer-readable recording medium. The computer-readable recording medium may separately include each of a program command, a data file, a data structure, etc. or may include a combination thereof. The program command recorded on the computer-readable medium may be specially designed and constructed for the inventive concepts or may be known to and usable by one of ordinary skill in the field of computer software. Examples of the computer-readable recording medium include magnetic media, such as hard discs, floppy discs, and magnetic tapes, optical media, such as compact disc-read only memories (CD-ROMs) and digital versatile discs (DVDs), magneto-optical media, such as floptical discs, and hardware devices specially configured to store and execute program commands, such as ROMs, RAMs, and flash memories. Examples of the program command include advanced language codes that may be executed by a computer by using an interpreter or the like, as well as machine language codes made by a compiler.

According to some example embodiments, the wearable electronic device 1000 may control, via a first circuit (e.g., the processor 101) of the display 1511, transmission timings of at least one piece of background image data and at least one piece of ROI image data to be synchronized to an input timing of the at least one piece of background image data and the at least one piece of ROI image data via a second circuit (e.g., the timing controller 111) or a mixing timing of the at least one piece of background image data and the at least one of ROI image data via the second circuit (e.g., the timing controller 111), and thus, may generate a foveated image without an additional element (e.g., an intermediate buffer). As a result, the wearable electronic device 1000 may generate foveated images with improved power consumption efficiency (e.g., with reduced power consumption) and may have improved compactness (e.g., reduced size), for example based on being configured to generate a foveated image without the additional element based at least in part upon controlling transmission timings of at least one piece of background image data and at least one piece of ROI image data to be synchronized to an input timing of the at least one piece of background image data and the at least one piece of ROI image data or a mixing timing of the at least one piece of background image data and the at least one of ROI image data.

As described herein, any devices, systems, modules, portions, units, controllers, circuits, and/or portions thereof according to any of the example embodiments, and/or any portions thereof (including, without limitation, the display system, the display device 100, the processor 101, the DDI circuit 110, the timing controller 111, the scan driver 112, the data driver 113, the display panel DP, the PMIC 120, the at least one sensor 118, the memory 150, the mobile terminal 200, the server 300, the frame buffer A 151, the frame buffer B 152, the DMA A 102, the DMA B circuit 103, the TX A 104, the T" B 1'5, the first sync generator 107, the RX A 512, the RX B circuit 513, the line buffer A 114, the line buffer B 115, the scaler A 116, the second sync generator circuit 117, the scaler B 119, the image mixer 121, the wearable electronic device 1000, the output portion 1510, the display 1511, the sound output portion 1512, the vibration motor 1513, the controller 1520, the user input portion 1530, the communication portion 1540, the short-range wireless communicator 1541, the mobile communicator 1542, the broadcasting receiver 1543, the sensing portion 1550, the magnetic sensor 1551, the acceleration sensor 1552, the inclination sensor 1553, the depth sensor 1554, the gyroscope sensor 1555, the global positioning sensor 1556, the atmospheric sensor 1557, the proximity sensor 1558, the optical sensor 1559, the A/V input portion 1560, the image sensor 1561, the microphone 1562, the memory 1570, the UI module 1571, the notification module 1572, the speak to text (STT) module 1573, the image processing module 1574, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, systems, modules, portions, units, controllers, circuits, and/or portions thereof according to any of the example embodiments.

Any of the memories described herein, including, without limitation, the memory 150, the memory 1570, or the like may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM).

While the inventive concepts have been particularly shown and described with reference to some example embodiments thereof, it will be understood that various changes in form and details may be made therein without departing from the spirit and scope of the following claims.

What is claimed is:
1. A display device, comprising:
   a memory operable to store at least one piece of background image data and at least one piece of region of interest (ROI) image data;
   a timing controller including a scaler; and
   a processor in communication with the memory and the timing controller, the processor configured to:
     receive the at least one piece of background image data from the memory based on a first periodic timing signal;
     receive the at least one piece of ROI image data from the memory based on a second periodic timing signal;
     generate, via the scaler, a first periodic sync signal synchronized with the first periodic timing signal associated with the at least one piece of background image data;
     generate, via the scaler, a second periodic sync signal synchronized with the second periodic timing signal associated with the at least one piece of ROI image data;
     transmit, to the scaler, the at least one piece of background image data received from the memory during a first time period, according to the first periodic sync signal; and
     transmit, to the scaler, the at least one piece of ROI image data received from the memory during a second time period, according to the second periodic sync signal.

2. The display device of claim 1, wherein the processor is further configured to:
control a transmission timing of the at least one piece of background image data based on adjusting a cycle of the first periodic sync signal; and
control a transmission timing of the at least one piece of ROI image data based on adjusting a cycle of the second periodic sync signal.

3. The display device of claim 1, wherein the processor is further configured to:
control a transmission timing of the at least one piece of background image data based on adjusting a number of pixel lines transmitted during one cycle of the first periodic sync signal; and
control a transmission timing of the at least one piece of ROI image data based on adjusting a number of pixel lines transmitted during one cycle of the second periodic sync signal.

4. The display device of claim 1, wherein
the first time period is an entire period for generating an output image,
the second time period is a mixing period of the at least one piece of background image data and the at least one piece of ROI image data, the mixing period being included in the first time period, and
the processor is further configured to control a transmission timing of the at least one piece of ROI image data based on a start time point of the second time period.

5. The display device of claim 4, wherein the processor is further configured to:
transmit, to the memory, a first data control signal indicating a first valid transmission period included in the first time period; and
transmit, to the memory, a second data control signal indicating a second valid transmission period included in the second time period.

6. The display device of claim 5, wherein the processor is further configured to:
transmit, to the scaler, the at least one piece of background image data output from the memory during the first valid transmission period included in the first time period, according to the first periodic sync signal; and
transmit, to the scaler, the at least one piece of ROI image data output from the memory during the second valid transmission period included in the second time period, according to the second periodic sync signal.

7. The display device of claim 5, wherein
the first valid transmission period is determined based on any one of a cycle of the first periodic sync signal or a number of pixel lines transmitted during one cycle of the first periodic sync signal, and
the second valid transmission period is determined based on any one of a cycle of the second periodic sync signal or a number of pixel lines transmitted during one cycle of the second periodic sync signal.

8. The display device of claim 4, wherein
the start time point of the second time period is determined based on a position of an ROI of a user in the output image, and
a length of the second time period is determined based on a number of pixel lines included in the ROI of the user.

9. An operating method of a display device, the display device including a timing controller, a memory operable to store at least one piece of background image data and at least one piece of region of interest (ROI) image data, and a processor in communication with the memory and the timing controller, the operating method comprising:

receiving the at least one piece of background image data from the memory based on a first periodic timing signal;
receiving the at least one piece of ROI image data from the memory based on a second periodic timing signal;
generating, via the processor, a first periodic sync signal and a second periodic sync signal synchronized with a mixing timing of the at least one piece of background image data and the at least one piece of ROI image data, respectively;
transmitting, via the processor, the at least one piece of background image data to the timing controller during a first time period, according to the first periodic sync signal; and
transmitting, via the processor, the at least one piece of ROI image data to the timing controller during a second time period, according to the second periodic sync signal.

10. The operating method of claim 9, further comprising:
controlling, via the processor, a transmission timing of the at least one piece of background image data based on adjusting a cycle of the first periodic sync signal; and
controlling, via the processor, a transmission timing of the at least one piece of ROI image data based on adjusting a cycle of the second periodic sync signal.

11. The operating method of claim 9, further comprising:
controlling, via the processor, a transmission timing of the at least one piece of background image data based on adjusting a number of pixel lines transmitted during one cycle of the first periodic sync signal; and
controlling, via the processor, a transmission timing of the at least one piece of ROI image data based on adjusting a number of pixel lines transmitted during one cycle of the second periodic sync signal.

12. The operating method of claim 9, further comprising controlling a transmission timing of the at least one piece of ROI image data based on a start time point of the second time period,
wherein the first time period denotes an entire period for generating an output image, and
wherein the second time period denotes a mixing period of the at least one piece of background image data and the at least one piece of ROI image data, the mixing period being included in the first time period, wherein the second time period is determined based on a position of an ROI of a user in the output image.

13. The operating method of claim 12, further comprising:
transmitting, via the processor, a first data control signal to the memory, the first data control signal indicating a first valid transmission period included in the first time period; and
transmitting, via the processor, a second data control signal to the memory, the second data control signal indicating a second valid transmission period included in the second time period.

14. The operating method of claim 13, further comprising:
transmitting, via the processor, the at least one piece of background image data output from the memory to the timing controller during the first valid transmission period included in the first time period according to the first periodic sync signal; and
transmitting, via the processor, the at least one piece of ROI image data output from the memory to the timing controller during the second valid transmission period included in the second time period according to the second periodic sync signal.

15. The operating method of claim 13, wherein
the first valid transmission period is determined based on any one of a cycle of the first periodic sync signal or a number of pixel lines transmitted during one cycle of the first periodic sync signal, and
the second valid transmission period is determined based on any one of a cycle of the second periodic sync signal or a number of pixel lines transmitted during one cycle of the second periodic sync signal.

16. The operating method of claim 9, further comprising:
scaling up, via the timing controller, the at least one piece of background image data and the at least one piece of ROI image data; and
generating, via the timing controller, an output image based on mixing the scaled-up at least one piece of background image data and the scaled-up at least one piece of ROI image data.

17. A wearable electronic device comprising:
at least one sensor;
a timing controller; and
a processor in communication with the at least one sensor and the timing controller, wherein the processor is configured to
generate at least one piece of region of interest (ROI) image based on a gaze of a user tracked using the at least one sensor;
generate, via the timing controller, a first periodic sync signal and a second periodic sync signal synchronized with a mixing timing of at least one piece of background image data and the at least one piece of ROI image data, respectively;
transmit the at least one piece of background image data to the timing controller during a first time period according to the first periodic sync signal; and
transmit the at least one piece of ROI image data to the timing controller during a second time period according to the second periodic sync signal.

18. The wearable electronic device of claim 17, wherein the processor is further configured to:
control a transmission timing of the at least one piece of background image data based on adjusting a cycle of the first periodic sync signal; and
control a transmission timing of the at least one piece of ROI image data based on adjusting a cycle of the second periodic sync signal.

19. The wearable electronic device of claim 17, wherein the processor is further configured to:
control a transmission timing of the at least one piece of background image data based on adjusting a number of pixel lines transmitted during one cycle of the first periodic sync signal; and
control a transmission timing of the at least one piece of ROI image data based on adjusting a number of pixel lines transmitted during one cycle of the second periodic sync signal.

20. The wearable electronic device of claim 17, wherein
the first time period is a period for generating an output image, and
the second time period is a mixing period of the at least one piece of background image data and the at least one piece of ROI image data, the mixing period being included in the first time period, wherein a start time point of the second time period is determined based on a position of an ROI of the user in the output image.

* * * * *